(12) United States Patent  (10) Patent No.: US 7,869,803 B2
Corson et al.  (45) Date of Patent: Jan. 11, 2011

(54) PROFILE MODIFICATION FOR ROAMING IN A COMMUNICATIONS ENVIRONMENT

(75) Inventors: Mathew Scott Corson, Gillette, NJ (US); Alan O'Neill, Henley Beach (AU); Vincent D. Park, Budd Lake, NJ (US); George Tsirtsis, London (GB); Michaela Vanderveen, Tracy, CA (US)

(73) Assignee: QUALCOMM Incorporated, San Diego, CA (US)

( * ) Notice: Subject to any disclaimer, the term of this patent is extended or adjusted under 35 U.S.C. 154(b) by 638 days.

(21) Appl. No.: 11/742,586

(22) Filed: Apr. 30, 2007

(65) Prior Publication Data

US 2007/0298788 A1  Dec. 27, 2007

Related U.S. Application Data

(63) Continuation-in-part of application No. 10/435,622, filed on May 9, 2003.

(60) Provisional application No. 60/837,656, filed on Aug. 14, 2006, provisional application No. 60/796,704, filed on May 1, 2006, provisional application No. 60/797,010, filed on May 1, 2006, provisional application No. 60/797,029, filed on May 1, 2006, provisional application No. 60/796,808, filed on May 1, 2006, provisional application No. 60/797,038, filed on May 1, 2006, provisional application No. 60/796,653, filed on May 1, 2006, provisional application No. 60/418,526, filed on Oct. 15, 2002.

(51) Int. Cl.
*H04Q 7/20* (2006.01)

(52) U.S. Cl. .................................... 455/433; 45/432.1
(58) Field of Classification Search ............. 455/432.1, 455/432.3, 433, 435.1–435.2
See application file for complete search history.

(56) References Cited

U.S. PATENT DOCUMENTS

| 4,679,244 | A | 7/1987 | Kawasaki et al. |
| 4,833,701 | A | 5/1989 | Comroe et al. |
| 4,901,307 | A | 2/1990 | Gilhousen et al. |
| 5,056,109 | A | 10/1991 | Gilhousen et al. |
| 5,095,529 | A | 3/1992 | Comroe et al. |
| 5,128,938 | A | 7/1992 | Borras |

(Continued)

FOREIGN PATENT DOCUMENTS

CN  1553741  12/2004

(Continued)

OTHER PUBLICATIONS

International Search Report—PCT/US07/067922, International Search Authority—European Patent Office—Oct. 26, 2007.

(Continued)

*Primary Examiner*—CongVan Tran
(74) *Attorney, Agent, or Firm*—Donald C. Kordich

(57) ABSTRACT

The claimed subject matter relates to systems and methods for roaming in a wireless communications environment. A method for roaming between networks is provided in one aspect. This includes receiving a request for network access at a visited network and receiving a profile from a home network in response to the request. Upon receiving the profile, selectively offering services to one or more access terminals based at least in part on the profile.

25 Claims, 20 Drawing Sheets

U.S. PATENT DOCUMENTS

| | | | |
|---|---|---|---|
| 5,200,952 A | 4/1993 | Bernstein et al. |
| 5,210,787 A | 5/1993 | Hayes et al. |
| 5,229,992 A | 7/1993 | Jurkevich et al. |
| 5,247,516 A | 9/1993 | Bernstein et al. |
| 5,251,209 A | 10/1993 | Jurkevich et al. |
| 5,267,261 A | 11/1993 | Blakeney, II et al. |
| 5,325,432 A | 6/1994 | Gardeck et al. |
| 5,333,178 A | 7/1994 | Norell |
| 5,369,781 A | 11/1994 | Comroe et al. |
| 5,387,905 A | 2/1995 | Grube et al. |
| 5,420,909 A | 5/1995 | Ng et al. |
| 5,426,395 A | 6/1995 | Cygan |
| 5,450,405 A | 9/1995 | Maher et al. |
| 5,461,645 A | 10/1995 | Ishii |
| 5,463,617 A | 10/1995 | Grube et al. |
| 5,465,391 A | 11/1995 | Toyryla |
| 5,473,605 A | 12/1995 | Grube et al. |
| 5,491,835 A | 2/1996 | Sasuta et al. |
| 5,511,232 A | 4/1996 | O'Dea et al. |
| 5,513,381 A | 4/1996 | Sasuta |
| 5,542,108 A | 7/1996 | Sasuta |
| 5,566,366 A | 10/1996 | Russo et al. |
| 5,572,528 A | 11/1996 | Shuen |
| 5,590,175 A | 12/1996 | Gallant et al. |
| 5,590,396 A | 12/1996 | Henry |
| 5,594,948 A | 1/1997 | Talarmo et al. |
| 5,625,882 A | 4/1997 | Vook et al. |
| 5,627,882 A | 5/1997 | Chien et al. |
| 5,634,197 A | 5/1997 | Paavonen |
| 5,694,433 A | 12/1997 | Dent |
| 5,806,007 A | 9/1998 | Raith et al. |
| 5,884,196 A | 3/1999 | Lekven et al. |
| 5,898,922 A | 4/1999 | Reininghaus |
| 5,901,362 A | 5/1999 | Cheung et al. |
| 5,903,559 A | 5/1999 | Acharya et al. |
| 5,953,653 A * | 9/1999 | Josenhans et al. ........... 455/410 |
| 5,987,323 A | 11/1999 | Huotari |
| 6,011,969 A | 1/2000 | Vargas et al. |
| 6,021,123 A | 2/2000 | Mimura |
| 6,021,326 A | 2/2000 | Nguyen |
| 6,043,707 A | 3/2000 | Budnik |
| 6,055,236 A | 4/2000 | Nessett et al. |
| 6,078,575 A | 6/2000 | Dommety et al. |
| 6,092,111 A | 7/2000 | Scivier et al. |
| 6,134,226 A | 10/2000 | Reed et al. |
| 6,144,671 A | 11/2000 | Perinpanathan et al. |
| 6,160,798 A | 12/2000 | Reed et al. |
| 6,161,008 A | 12/2000 | Lee et al. |
| 6,195,705 B1 | 2/2001 | Leung |
| 6,225,888 B1 | 5/2001 | Juopperi |
| 6,256,300 B1 | 7/2001 | Ahmed et al. |
| 6,275,712 B1 | 8/2001 | Gray et al. |
| 6,285,251 B1 | 9/2001 | Dent et al. |
| 6,308,080 B1 | 10/2001 | Burt et al. |
| 6,308,267 B1 | 10/2001 | Gremmelmaier |
| 6,353,616 B1 | 3/2002 | Elwalid et al. |
| 6,366,561 B1 | 4/2002 | Bender |
| 6,366,577 B1 | 4/2002 | Donovan |
| 6,389,008 B1 | 5/2002 | Lupien et al. |
| 6,400,703 B1 | 6/2002 | Park et al. |
| 6,400,722 B1 | 6/2002 | Chuah et al. |
| 6,430,213 B1 | 8/2002 | Dafesh |
| 6,434,134 B1 | 8/2002 | La Porta et al. |
| 6,445,922 B1 | 9/2002 | Hiller et al. |
| 6,446,127 B1 | 9/2002 | Schuster et al. |
| 6,463,055 B1 | 10/2002 | Lupien et al. |
| 6,466,964 B1 | 10/2002 | Leung et al. |
| 6,477,150 B1 | 11/2002 | Maggenti et al. |
| 6,487,170 B1 | 11/2002 | Chen et al. |
| 6,487,407 B2 | 11/2002 | Goldberg et al. |
| 6,490,564 B1 * | 12/2002 | Dodrill et al. ............... 704/275 |
| 6,496,505 B2 | 12/2002 | La Porta et al. |
| 6,496,704 B2 | 12/2002 | Yuan |
| 6,498,934 B1 | 12/2002 | Muller |
| 6,505,047 B1 | 1/2003 | Palkisto |
| 6,510,144 B1 | 1/2003 | Dommety et al. |
| 6,512,754 B2 | 1/2003 | Feder et al. |
| 6,519,254 B1 | 2/2003 | Chuah et al. |
| 6,539,225 B1 | 3/2003 | Lee |
| 6,546,252 B1 | 4/2003 | Jetzek et al. |
| 6,563,919 B1 | 5/2003 | Aravamudhan et al. |
| 6,567,416 B1 | 5/2003 | Chuah |
| 6,567,664 B1 | 5/2003 | Bergenwall et al. |
| 6,571,095 B1 | 5/2003 | Koodli |
| 6,571,289 B1 | 5/2003 | Montenegro |
| 6,578,085 B1 | 6/2003 | Khalil et al. |
| 6,584,093 B1 | 6/2003 | Salama et al. |
| 6,611,506 B1 | 8/2003 | Huang et al. |
| 6,611,547 B1 | 8/2003 | Rauhala |
| 6,615,236 B2 | 9/2003 | Donovan et al. |
| 6,631,122 B1 | 10/2003 | Arunachalam et al. |
| 6,631,254 B1 | 10/2003 | Wilson et al. |
| 6,636,498 B1 | 10/2003 | Leung |
| 6,650,901 B1 | 11/2003 | Schuster et al. |
| 6,654,363 B1 | 11/2003 | Li et al. |
| 6,668,166 B1 | 12/2003 | Kanabar |
| 6,678,735 B1 | 1/2004 | Orton et al. |
| 6,680,943 B1 | 1/2004 | Gibson et al. |
| 6,690,936 B1 | 2/2004 | Lundh |
| 6,708,031 B2 | 3/2004 | Purnadi et al. |
| 6,724,267 B2 | 4/2004 | Kim |
| 6,731,932 B1 * | 5/2004 | Rune et al. ............... 455/432.1 |
| 6,754,482 B1 * | 6/2004 | Torabi ....................... 455/410 |
| 6,763,007 B1 | 7/2004 | La Porta et al. |
| 6,785,256 B2 | 8/2004 | O'Neill |
| 6,879,690 B2 | 4/2005 | Faccin et al. |
| 6,917,605 B2 | 7/2005 | Kakemizu et al. |
| 6,947,401 B2 | 9/2005 | El-Malki et al. |
| 6,954,442 B2 | 10/2005 | Tsirtsis et al. |
| 6,965,946 B2 | 11/2005 | Inoue et al. |
| 6,970,445 B2 | 11/2005 | O'Neill et al. |
| 6,990,339 B2 | 1/2006 | Turanyi et al. |
| 6,992,994 B2 | 1/2006 | Das et al. |
| 6,996,379 B2 | 2/2006 | Khorram |
| 7,068,640 B2 | 6/2006 | Kakemizu et al. |
| 7,096,014 B2 | 8/2006 | Haverinen et al. |
| 7,110,727 B2 | 9/2006 | Dekker |
| 7,116,646 B1 * | 10/2006 | Gustafson et al. ........... 370/313 |
| 7,123,599 B2 | 10/2006 | Yano et al. |
| 7,133,456 B2 | 11/2006 | Feher |
| 7,139,548 B2 | 11/2006 | Hayashi et al. |
| 7,161,913 B2 | 1/2007 | Jung |
| 7,187,928 B1 * | 3/2007 | Senn et al. ................ 455/432.1 |
| 7,257,402 B2 | 8/2007 | Khalil et al. |
| 7,269,145 B2 | 9/2007 | Koo et al. |
| 7,292,592 B2 | 11/2007 | Rune |
| 7,333,452 B2 | 2/2008 | Lim |
| 7,336,753 B2 | 2/2008 | Hasson et al. |
| 2002/0136226 A1 | 9/2002 | Christoffel et al. |
| 2002/0186679 A1 | 12/2002 | Nakatsugawa et al. |
| 2003/0051140 A1 | 3/2003 | Buddhikot et al. |
| 2003/0071417 A1 | 4/2003 | Webb |
| 2003/0092441 A1 * | 5/2003 | Taha et al. .................. 455/433 |
| 2003/0137991 A1 | 7/2003 | Doshi et al. |
| 2003/0228868 A1 | 12/2003 | Turanyi et al. |
| 2004/0037264 A1 | 2/2004 | Khawand |
| 2005/0014509 A1 | 1/2005 | Semper et al. |

FOREIGN PATENT DOCUMENTS

| | | |
|---|---|---|
| EP | 1244261 A2 | 9/2002 |
| WO | WO9512297 A1 | 5/1995 |
| WO | WO9627993 A1 | 9/1996 |
| WO | WO9712475 A1 | 4/1997 |

| WO | WO9847302 | 10/1998 |
| WO | 2006020105 | 2/2006 |

OTHER PUBLICATIONS

""Source Specific Multicast (SSM) Explicit Multicast (XCAST)"" pp. 1-27 (Copyright 2001 by ETRI).

"SIP: Session Initiation Protocol", IETF Network Working Group, Request for Comments: 3261, Jun. 2002, pp. 1-29.

Valko, ""Cellular IP—A New Approach to Internet Host Mobility,"" ACM Computer Communication Review, vol. 29, No. 1, pp. 50-65, Jan. 1999.

Campbell et al., "IP Micro-Mobility Protocols", ACM SIGMOBILE Mobile Computer and Communication Review (MC2R), vol. 4, No. 4, pp. 34-54, Oct. 2001.

Becker et al. "RF Power Control in GSM Systems for Constant and Non Constant Envelope Modulation Schemes," Proceedings of 2003 Initial Symptoms on Circuits and Systems, ISCAS 2003, vol. 3, pp. III-602 to III-605.

Bos, L., et al., A Framework for End-to-End Perceived Quality of Service Negotiation, IETF Internet Draft, draft-bos-mmusic-sdpqos-framework-00.txt, Nov. 2001, pp. 1-22.

C. Perkins, Editor "IP Mobility Support", Network Working Group, pp. 1-79 (Oct. 1996).

Camarillo, P., et al., "Integration of Resource Management and SIP", IETF InternetDraft, draft-ietf-sip-manyfolks-resource-04.ps, Feb. 25, 2002 pp. 1-18.

Elin Wedlund et al., ""Mobility Support Using SIP"", Proc. Of ACM/IEEE International Conference on Wireless and Mobile Multimedia (WoWMoM '99), Seattle, Washington, Aug. 1999.

Schulzrinne et al., ""Application-Layer Mobility Using SIP"", 0-7803-7133 IEEE, pp. 29-36, Jan. 2000.

Ho, "Integration AAA with Mobile IPv4", Internet Draft, pp. 1-59, Apr. 2002.

IETF Mobile IP Working Group, "Mobility Support in IPv6", D. Johnson, Rice University,C. Perkins, Nokia Research Center, J. Arkko, Ericsson; Feb. 26, 2003, downloaded from http://www.join.uni-muenster.de on Dec. 29, 2004, pp. 1-158.

IETF Network Working Group, Request for Comments: 2961, RSVP Refresh Overhead Reduction Extensions, pp. 1-32 (Apr. 2001).

IETF, Network Working Group, Request for Comments: 2205, Resource Reservation Protocol (RSVP)—Version 1 Functional Specification, pp. 1-105 (Sep. 1997).

IETF, Network Working Group, Request for Comments: 2206, RSVP Management Information Base Using SMIv2, pp. 1-60 (Sep. 1997).

IETF, Network Working Group, Request for Comments: 2207, RSVP Extension for IPSEC Data Flows, pp. 1-14 (Sep. 1997).

IETF, Network Working Group, Request for Comments: 2208, Resource Reservation Protocol (RSVP) Version 1 Applicability Statement Some Guidelines on Deployment, pp. 1-6 (Sep. 1997).

IETF, Network Working Group, Request for Comments: 2209, Resource Reservation Protocol (RSVP)—Version 1 Message Processing Rules, pp. 1-24 (Sep. 1997).

IETF, Network Working Group, Request for Comments: 2210, The Use of RSVP with IETF Integrated Services, pp. 1-31 (Sep. 1997).

IETF, Network Working Group, Request for Comments: 3261 "SIP: Session Initiation Protocol", pp. 1-269 (printed as pp. 1-252) (Jun. 2002).

J. Moy, Editor, "OSPF Version 2", Network Working Group, pp. 1-244 (Apr. 1998).

Karagiannis, Mobile IP, State of the Art Report, pp. 1-63, Jul. 1999.

Li, Yalun "Protocol Architecture for Universal Personal Computing" IEEE Journal on Selected Areas in Communications 15(8): 1467-1476 (1997).

Liang et al: "Nonlinear amplifier Effects in Communications Systems," IEEE Trans. On Microwave Theory and Techniques, vol. 47, No. 8, Aug. 1999, pp. 1461-1466.

Marshall W., et al., "Integration of Resource Management and SIP", IETF Internet Draft, draft-ietf-sip-manyfolks-resource-02.txt, Aug. 2001, pp. 1-28.

S. Zhou et al., "A Location Management Scheme for Mobility Support in Wireless IP Networks Using Session Initiation Protocol (SIP)", 1531-2216/01 IEEE, pp. 486-491, Oct. 2001.

TIA/EIA/IS-707A.8 "Data Service Options for Spread Spectrum Systems: Radio Link Protocol Type 2" pp. 1-1:4:12 (Mar. 1999).

Written Opinion—PCT/US07/067922, International Search Authority—European Patent Office—Oct. 26, 2007.

Aboba et al., "The Network Access Identifier", Request for Comments (RFC) 2486. Jan. 1999, 8 pages.

* cited by examiner

PROFILE MODIFICATION FOR ROAMING IN A COMMUNICATIONS ENVIRONMENT

CROSS REFERENCE TO RELATED APPLICATION

This application claims the benefit of U.S. Provisional Patent Appl. No. 60/837,656, filed Aug. 14, 2006, Entitled "A Method and Apparatus for Network Access Subsystem; U.S. Provisional Patent Appl. No. 60/796,704, filed May 1, 2006, Entitled "A Method and Apparatus for Subscriber Service Framework"; U.S. Provisional Patent Appl. No. 60/797,010, filed May 1, 2006, Entitled "A method and Apparatus for Using Subscriber Profile to Authorize Subscriber"; U.S. Provisional Patent Appl. No. 60/797,029, filed May 1, 2006, Entitled "A Method and Apparatus for Quality of Service in a Flash Network"; U.S. Provisional Patent Appl. No. 60/796,808, filed May 1, 2006, Entitled "A Method and Apparatus for Flash System"; U.S. Provisional Patent Appl. No. 60/797,038 filed May 1, 2006, Entitled "A Method and Apparatus for Connection Control Protocol"; and U.S. Provisional Patent Appl. No. 60/796,653, file May 1, 2006, Entitled "A Method and Apparatus for Mobility Aware Resource Control" of which are incorporated herein by reference. This application also is a continuation-in-part of U.S. patent application Ser. No. 10/435,622, filed on May 9, 2003, entitled Method and Apparatus for Providing Authentication, Authorization and Accounting to Roaming Nodes which also claims the benefit of U.S. Provisional Patent Appl. No. 60/418,526, filed Oct. 15, 2002, Entitled "Methods and Apparatus to Secure a Communications Access Link and Mobility Session in a Foreign Network.

BACKGROUND

I. Field

The following description relates generally to communications systems, and more particularly to enabling profile modifications to support services when roaming between networks.

II. Background

Communication networks, such as wireless communication networks, broadband networks, and other suitable networks are utilized in connection with transferring data, wherein data can include word processing files, streaming video, multimedia files, voice data, and/or the like. When using such networks, some subscribers to the network may be provided with different quality of service (QoS) parameters than other subscribers. Pursuant to an example, a first individual may subscribe to a Digital Subscriber Line (DSL) network and be provided with first upload and download speeds, while a second individual subscribed to the DSL network may pay a different subscription rate than first individual and be provided with different upload and download speeds. With still more specifically, the first subscriber may pay a first rate for 1 Megabyte/second download connection speed while the second subscriber may pay a second rate for 512 Kilobyte/second download connection speed.

Additionally, users of networks can be provided with different services. For instance, wireless network subscribers can purchase subscriptions that enable web-browsing, text message delivery and receipt, voice calls, data transmittal (e.g., video, pictures, sound clips, . . . ), gaming, etc. As the delivery requirements of application flows corresponding to various services are different, it may be desirable to associate the traffic flows of various services with different QoS parameters (e.g., latency, bandwidth, . . . ). While traditional communication networks have only supported a relatively small set of services, emerging communication networks based on the Internet Protocol enable a potentially limitless set of services. This exposes a need for improvements in controlling services and managing associated QoS support.

Some communication networks support the capability to roam, where a subscriber obtains access via a visited network that is administratively different from the home network with which the subscriber is affiliated. Traditionally, in such cases the visited and home networks are based on similar technologies, thus the visited network simply allows the subscriber to utilize services offered by its home network. However, given the possibility for a larger number of different services in emerging communication networks combined with the desire to enable roaming between networks based on potentially different technologies, there is a need to more flexibly control roaming of services.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Roaming between networks is facilitated by modifiable profiles that are exchanged when an access terminal roams from a home network to a visited network. When a mobile access terminal comes in contact with a network other than the home network due to roaming, the visited network (from the terminal's point of view) can request a profile that describes services that may have been offered by the home network. The profile can be sent to the visited network upon receiving an access grant for services from the home network. After receiving the profile, the visited network can selectively offer similar services specified by the profile, a subset of services specified in the profile, and/or provide a superset of services in addition to those originally specified by the profile. Thus, the profile can be modified where services can be added or deleted from those originally specified by the home network. Service can include Quality of Service considerations that are related to a plurality of differing communications considerations such as bandwidth, latency, loss tolerances, and so forth. By allowing profiles to be modified by the visited network or domain, communications capability can be dynamically scaled up or down as conditions change.

To the accomplishment of the foregoing and related ends, certain illustrative aspects are described herein in connection with the following description and the annexed drawings. These aspects are indicative, however, or but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

System and methods are provided to facilitate roaming in a wireless communications network. In an aspect, a method for roaming between network and receiving a profile from a home network in response to the request. Upon receiving the profile, selectively offering services to one or more access terminals based at least in part on the profile. The profile can be modified by the visited network to offer similar services, a subset of services, and/or a superset of services than originally specified by the home network.

Furthermore, various aspects are described herein in connection with a terminal. A terminal can also be called a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof of control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Figure 1:
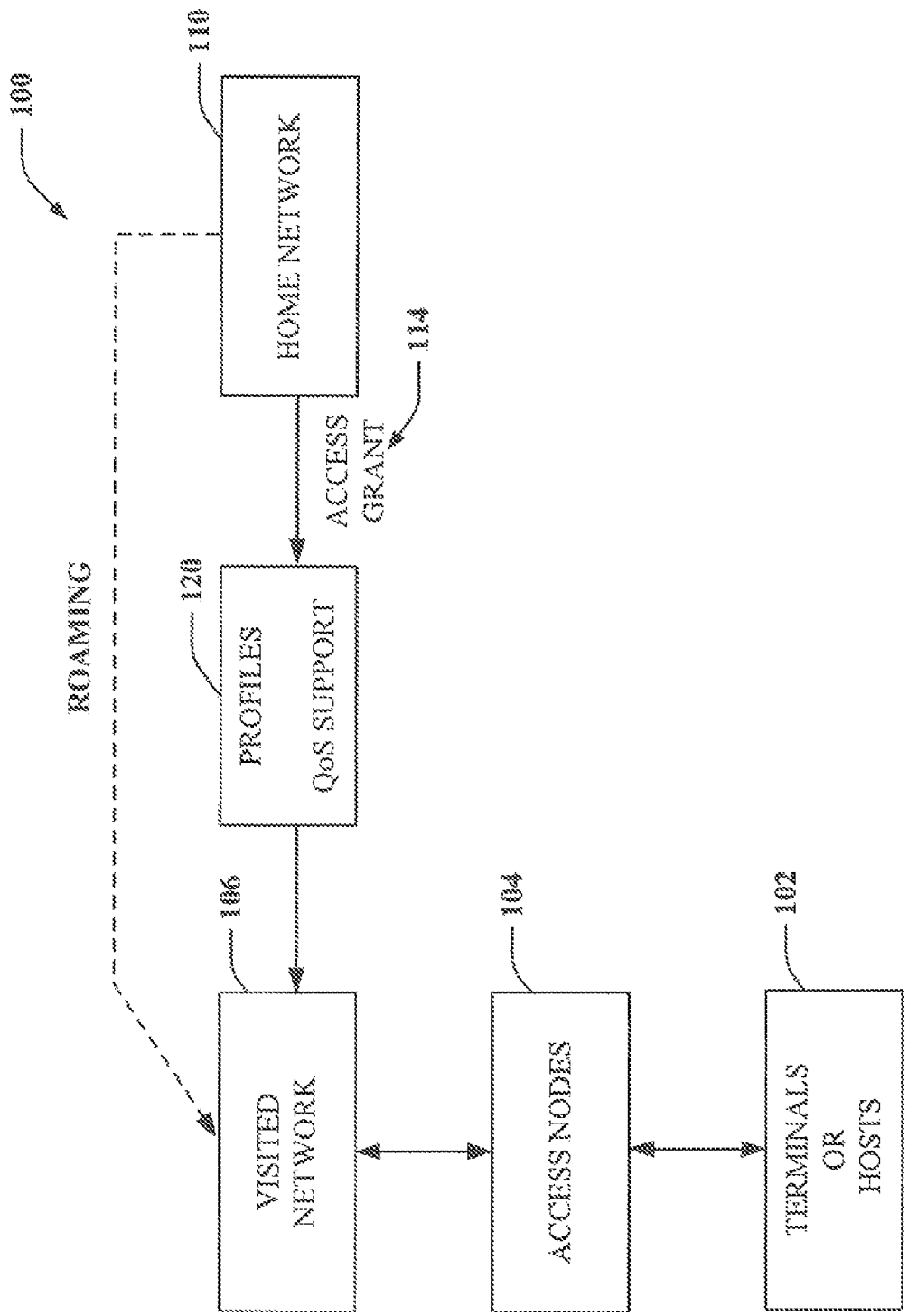
FIG. 1 is a high level block diagram of a system that is provided to illustrate profile modification for roaming in a communications environment.

Referring now to FIG. 1, a system 100 illustrates profile modifications for roaming to facilitate communications in a wireless network. A wireless terminal 102 (also referred to as host) communicates with an access node 104 that is also in communications with a visited network or domain 106, where the visited network is encountered as the wireless or access terminal roams from being served by a home network 110. It is noted that the access node 104 may also be considered part of the visited network or domain 106. The access node 104 is also referred to as a base station or an access router and employs various nodes, elements, and/or systems include in the visited network 106 for such services as authenticating a service request, authorizing a service, establishing a session, and so forth as will be described in more detail below. Initially, the visited network 106 receives a request for network access from the wireless terminal 102. After some handshaking with the home network 110 to determine available services for the wireless terminal 102, an access grant 114 is generated by the home network where a profile 120 describing services from the home network is transmitted in response to the request.

Upon receiving the profile 120, the visited network 106 can selectively offer services to one or more access terminals 102 based at least in part on the received profile 120. As will be described in more detail below, the services specified by the profile can relate to Quality of Service (QoS) parameters for the respective wireless terminal and the communications session established by the request to the visited network 106. In an aspect, the visited network 106 processes, modifies, deletes, or adds services to the profile 120. This enables the visited network 106 to selectively offer a subset of services from the profile 120 and/or to offer additional services than specified by the profile. By allowing profile modifications, the visited network can dynamically tailor its offerings based on current resource conditions or other considerations.

In an aspect, the system 100 allows for controlling services and Quality of Services (QoS) support associated with a subscriber, and/or subscriber device 102, when roaming, e.g., obtaining access via a visited, as opposed to the home, operator's network 110. In such roaming scenarios, it is desirable for services and QoS support defined by the home operator at 110 to be selectively supported in the visited operator's network 106 and for the visited operator to have the flexibility to offer additional and/or alternative services and QoS support, if desired.

In accordance with another aspect, the subscriber profile 120 can be included in the access grant message 114 sent from, e.g., a home network 110 authentication and authorization server (AAS) to a visited network AAS. It is to be appreciated, that the profile 120 can be exchange between other network components as well. Subsequently, the access grant message 114 is generated, where the subscriber profile 120, is sent e.g., from the visited AAS to the access code 104 through which the subscriber device 102 is requesting access. The subscriber profile 120 prescribes the configuration of one or more QoS parameters and/or or includes pre-authorization information for subsequent QoS configuration changes as needed to provide service differentiation between subscribers and/or between various application services authorized for use by a given subscriber.

The subscriber profile 120 as provided by the home AAS or other network component can be modified by one or more components in the visited network 106, e.g., the visited AAS and/or the access node. Thus, the visited network operator can modify the subscriber profile 120 to be consistent with services offered in the visited operator's network 106 e.g., add, modify, or delete a service. By allowing modifications to the profile 120, the system 100 enables flexibility in controlling services and QoS when roaming. This allows subscriber services to be changed, e.g., added, modified, deleted, by the visited network operator. This approach of changing the profile at the visited network 106 also enables evolution of offered service definitions due to flexibility of using XML (or other structure) to define services in the subscriber profile 120.

The terminal 102, which can be, for instance, a module such as an SD card, a network card, a wireless network card, a computer (including laptops, desktops, personal digital assistants PDAs), mobile phones, smart phones, or any other suitable terminal that can be utilized to access a network. Terminal 102 accesses the network by way of an access node 104. For instance, terminal 102 can be communicatively coupled to access node 104 by way of a wired connection, such as an Ethernet cable, a USB connection, etc. In another example, a connection between terminal 102 and access node 104 may be wireless in nature, in which access node 104 may be a base station and terminal 102 may be a wireless terminal. For instance, terminal 102 and access node 104 may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA), or any other suitable protocol.

Similarly to terminal 102, access node 104 can be an access node associated with a wired network or a wireless network. To that end, access node 104 can be, for instance, a router, a switch, or the like. The access node 104 can include one or more interfaces, e.g., communications modules, for communicating with other network codes. Additionally, access node 104 may be a base station (or wireless access point) in a cellular type network, wherein based stations (or wireless access points) are utilized to provide wireless coverage areas to a plurality of subscribers. Such base stations (or wireless access points) can be arranged to provide contiguous areas of coverage to one or more cellular phones and/or other wireless terminals.

As noted above, the system 100 can also include an authentication and authorization server (AAS) at 106 and at 110, which aids in enabling terminal 102 to send/receive data over a network through use of access node 104. While shown as being a separate entity, it is understood that AAS 106 can be included within access node 104. With respect to authentication/authorization, terminal 102 can provide data that is indicative of identity of such terminal 102 and/or a subscriber associated therewith to AAS 106 by way of access node 104. The access node 104 can relay the identifying data to AAS 106 without modification or can modify such data according to any suitable data format/protocol. Upon receiving of the identifying indicia, AAS 106 can authenticate terminal/subscriber identity and determine whether terminal 102 (and/or a subscriber) is authorized for one or more services.

The process of authentication/authorization may, and in some embodiments does, include the exchange of one or more signals between terminal 102, access node 104, and/or AAS 106. If terminal 102 and/or a subscriber associated therewith is authorized for services, AAS 106 can relay a modified profile assigned to terminal 102 (or the associated subscribers) to access node 104, wherein the profile includes at least description of QoS parameters associated with one or more traffic flows relating to terminal 102, wherein a data flow can be defined as a series of related data packets (e.g., as identified based on inspection of packet headers and/or packet payloads). The profile 120 can also include filter rules that facilitate association of data packets of traffic flows and associating prescribed QoS treatments to certain traffic flows and/or data packets. Pursuant to an example, data packets with headers indicating that such packets relate to voice data can be collectively referred to as a traffic flow. Similarly, data packets indicating that such packets relate to video data can be a separate traffic flow.

Access node 104, upon receipt to the profile, can monitor and enforce QoS treatment described within the received profile. For instance, a parameter that can be utilized in connection with described QoS treatment may relate to acceptable latency associated with a traffic flow, and access node 104 can perform scheduling with respect to the traffic flow to maintain an acceptable latency as described within the profile provided from AAS 106. Other QoS parameters within the received profile can relate to minimum acceptable data rate with respect to a particular traffic flow type, maximum acceptable data rate with respect to a particular traffic flow type, etc. Such parameters can be defined numerically (e.g., a minimum data rate with respect to a first traffic flow type is 128 Kb/sec) and/or relatively defined (e.g., latency with respect to a first traffic flow type is to be ½ of latency with respect to a second traffic flow type). Still further, definition of parameters can be contingent upon certain system or network state(s). In an example, a particular parameter may be relatively defined until reaching a threshold and thereafter numerically defined (e.g., a minimum data rate with respect to a first traffic flow should be twice as much as a second flow, but not exceed 1 Megabyte/second).

Additionally, the profile provided to access node 104 from AAS 106 can support object instances therein, thereby duplication of parameter definitions within the profile. For example, a gaming application that is authorized for use with respect to terminal 102 may use three parallel traffic flows to support such application. Rather than defining parameters with respect to each traffic flow, a definition can be created for a single traffic flow and instances of such definition can be utilized for related traffic flows. Moreover, the profile can include filter (e.g., classifications) rules, which can be employed in connection with identifying a particular traffic flow and associating such flow with an instance that determines QoS treatment to assign to the traffic flow. The access node 104, upon receipt of the profile, can be configured to provide QoS treatment to terminal 102 as prescribed in the profile and the pre-authorized data set 120. Thus, access node 104 can provide different QoS treatment with respect to various traffic flows and multiple users, thereby enhancing system performance and user experience.

Figure 2:
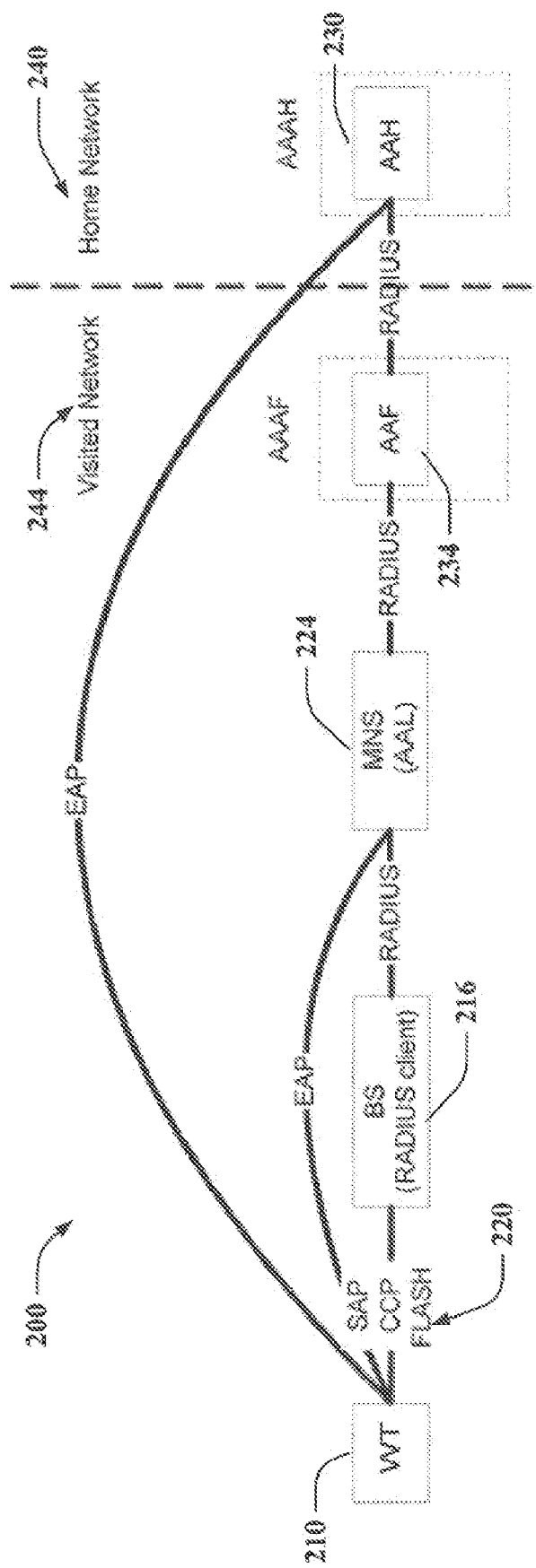
FIG. 2 is block diagram of an example network access system.

Referring now to FIG. 2, an example network access system 200 is illustrated that can employ modifiable profile data when roaming. Before proceeding, it is noted that the components and protocols shown in the system 200 are exemplary in nature where more or less than the components shown can be employed and/or other protocols shown can be utilized. The system 200 includes a Wireless Terminal (WT) 210 with a connection to a Base Station (BS) 216 via a FLASH Air Interface at 220. The BS 216 communicates with a Local Authentication and Authorization (AAL) Server 224 via network links. The AAL 224 can be provided as part of a Mobile Network Server (MNS). The AAL 224 communicates with other AA servers, such as a Home AA server (AAH) 230 and a Foreign AA server (AAF) 234. A Home Network 240 can be served by the AA server 230 that includes the original service establishment records of the WT 210. A Local or visited Network 244 is the network where the WT 210 happens to gain network connectivity.

If the WT 210 attempts to connect to the Home Network 240 directly (due to geographical location), the connection to the Home Network would include, e.g., communication between a BS, a MNS/AAL, and AAH that are all located in the Home Network (unlike what is shown in the FIG. 2). It is noted that the WT 210 is Local to the Visited network 244 when roaming (as shown in FIG. 2), and local to the Home network 240 when not. The system 200 also depicts the following example protocols that be employed when controlling network access. These can include a Connection Control Protocol (CCP), a Secure Association Protocol (SAP), a Remote Dial-In User Service (RADIUS) protocol, and/or an Extensible Authentication Protocol (EAP). As can be appreciated, other protocols can be employed to control network access.

Figure 3:
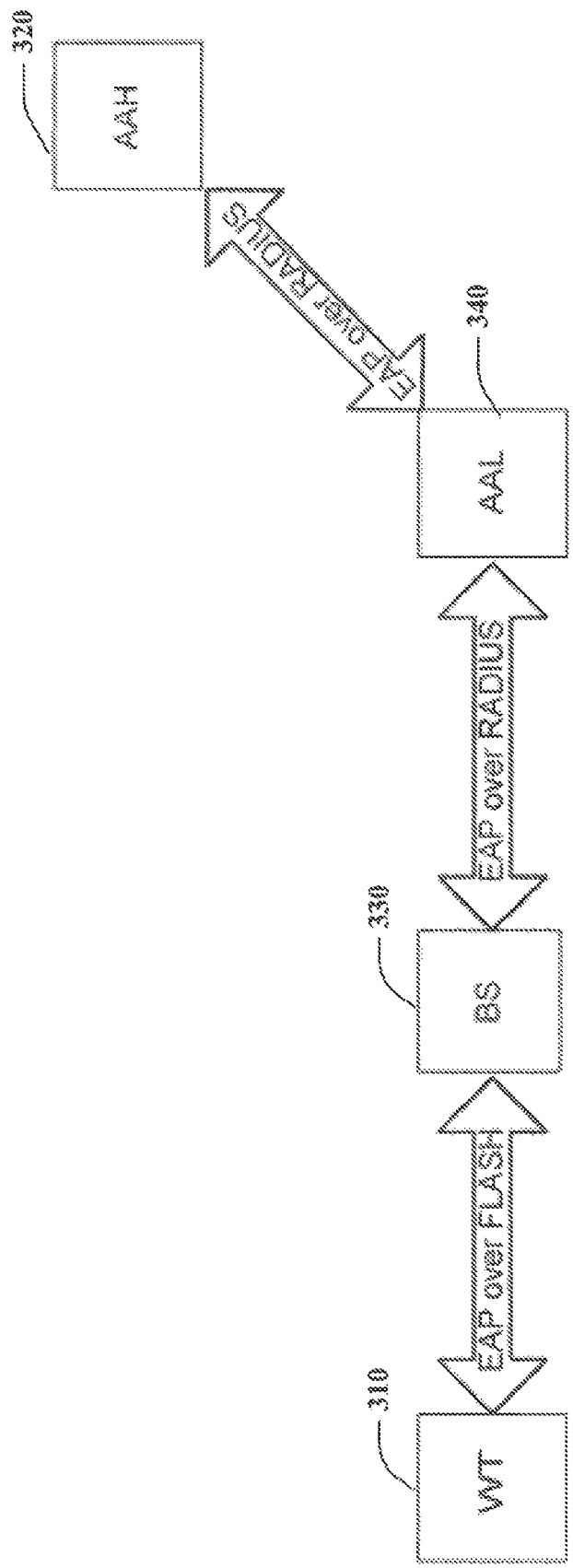
FIGS. 3 and 4 is a block diagram that illustrates an example authentication and authorization system.
Figure 4:
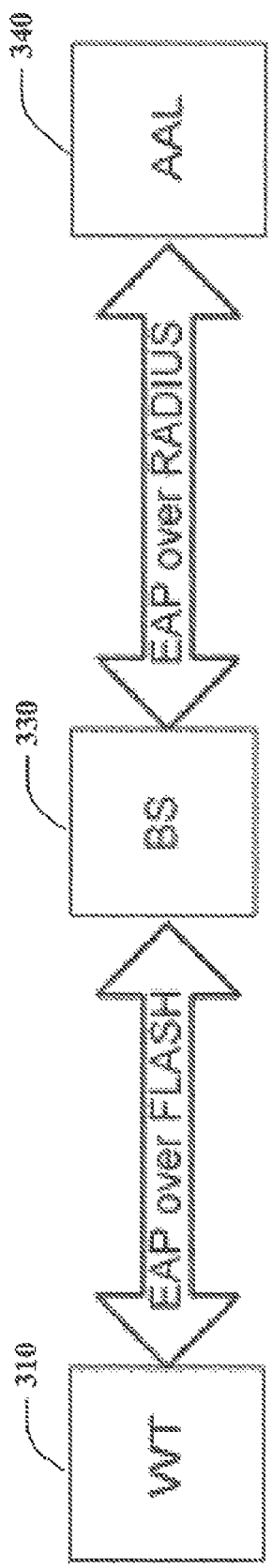

Now referring to FIGS. 3 and 4 collectively, a two tiered authentication protocol is illustrated. In one example, two phases of authentication for network access can be employed using one or two different Extensible Authorization Protocol (EAP) methods. The first phase shown in FIG. 3 involves authentication between a wireless terminal (WT) 310 and a Home network AA server (AAH) 320 through base station 330 and a Local network AA server (AAL) 340. A second phase achieves authentication between the WT 310 and the Local network AA server 340, as shown in FIG. 4. The two-phase authentication procedure generally takes place regardless of whether the WT 310 is located in its Home operator network or roaming in another operator's network. The WT 310 is expected to be served locally by the AAL 340, which is independent of its AAH 320. Two-phase authentication enables scalable roaming, as well as provides for proper handling of key material and services in the Local network, be that network Home or Visited. The two phases of EAP should be independent of each other. In other words, different mechanisms may be used in each phase as long as mutual authentication of the WT 310 and AA server 320, 340 is attainable.

In the first authentication phase depicted in FIG. 3, the AAL 240 acts as a RADIUS proxy. It is to be appreciated that other authentication protocols can be employed. The second phase achieves authentication between the WT 310 and the Local network (AAL Server) 340, where the AAH is not involved as shown in FIG. 4. The addition of a second phase of authentication with the Local network allows the WT 310 to establish trust locally. The Local network may be part of a Foreign operator's network (i.e., not Home operator), or part of the Home operator's administrative domain. Local trust establishment can be employed for several reasons including to shield the AAF/AH from local mobility impacts (regardless of whether the WT is roaming or not), to enable the use of the AAL 340 as a trusted third party for other protocols, and to provide a greater degree of subscriber identity privacy.

The authentication phase with the Local network allows for subscriber anonymity support. The AAL 340 allocates a temporary identifier to the WT 310, which cannot be linked to a permanent identifier to the WT by "listening" to the air interface. This is due in part to mechanisms that are in place such that the temporary WT identifier is communicated securely to the WT 310, ensuring confidentiality. Then, the WT 310 can use this temporary identifier to obtain future network access in this Local network, or for other host configuration purposes as required if the WT was present in the Home network. In addition establishing trust, profiles can be exchanged to further define services.

Figure 5:
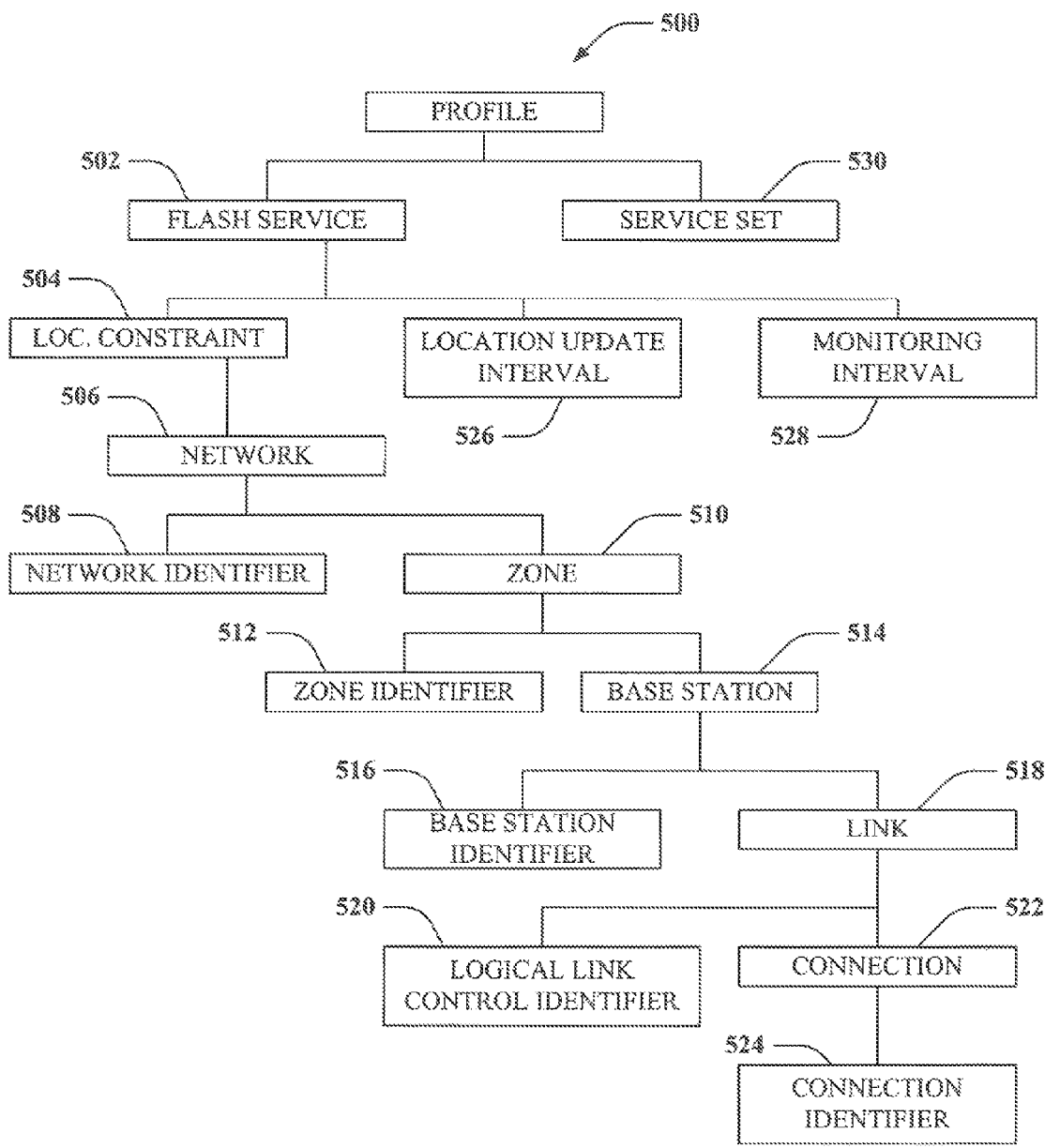
FIG. 5 illustrates example content of a profile.

Turning now to FIG. 5, an example profile 500 in accordance with one or more aspects described herein is illustrated. The profile 500 is a logical grouping of parameters that prescribe aspects of services authorized for use by a subscriber (a particular mobile terminal). It is understood, however, that field/elements within profile 500 can be altered, such that how elements are prescribed can be altered, logical arrangements can be altered, number of elements can be altered, and names of elements can be altered while in accordance with the subject claims. The profile 500 can be associated with a flash service element 502, which is a logical grouping of parameters associated with establishing and maintaining connectivity by way of an interface, such as an air interface, including a FLASH air interface. The flash service element 502 can be associated with a location constraint element 504, which is a collection of parameters that prescribe locations (or points of attachment) through which the subscriber may be granted access for services. When locations constraint element 504 is included within the profile 500, access can be limited as prescribed by elements included within location constraint element 504. Omission of location constraint element 504 indicates that access is not restricted to a list of prescribed locations, but can be restricted by other means, such as a roaming agreement.

The profile 500 can additionally include a network element 506, which can be a collection of parameters associated with a particular network through which a subscriber (terminal) may be granted access for services. Access can be limited to a set of indicated networks and, if desired, may not be granted through other networks. Network element 506 can be associated with a network identifier element 508, which can be globally unique identifier of a network through which the subscriber can be granted access for services. Network element 506 can additionally be associated with a zone element 510, which can be defined as a collection of parameters associated with a particular zone within a network through which the subscriber can be granted access for services. Access within a network can be limited to the set of indicated zones within zone element 510. Absence of zone element 510 can indicate that access within the network identified within network identifier element 508 is not restricted to a set of prescribed zones.

Zone element 510 can be relate to a zone identifier element 512, which can be locally unique identifier of a zone within a network through which the subscriber may be granted access for services. Zone element 510 can also be related to a base station element 514, which can be defined as a collection of parameters associated with a particular base station or access node (within a zone of a network) through which the subscriber may be granted access for services. Access within a zone can be limited to a set of indicated base stations within base station element 514. Absence of a base station element 514 can indicate that access within an identified zone is not restricted to a set of particular base stations.

Base station element 514 can be associated with a base station identifier 516, which can be a locally unique identifier of a base station within a zone of a network through which the subscriber may be granted access for services. Base station element 514 can additionally be related to a link element 518, which can be a collection of parameters associated with a particular link (corresponding to an identified base station within a zone of a network) through which a subscriber may be granted access for serves. For example, access by way of a base station can be limited to a set of links prescribed within the link element 518, and absence of a link element 518 within a profile can indicate that access by way of the corresponding base station is not restricted to a certain set of links.

Link element 518 can be associated with a logical link control identifier element 520, which can be a locally unique identifier of a link corresponding to a base station within a zone of a network through which the subscriber can be granted access for services. Link element 518 can also be associated with a connection element 522, which is a collection of parameters associated with a particular connection through which the subscriber can be granted access for services. For example, access by way of a link can be limited to a set of indicated connections. Absence of a connection element can indicate that access by way of the corresponding link is not restricted to a set of prescribed connections. Thus, if access by way of a particular link is not further constrained, then it may be desirable to not include connection element 522 within profile 500. Connection element 522 can be associated with a connection identifier element 524, which can be locally unique identifier of a connection corresponding to a link and base station within a zone of a network through which the subscriber may be granted access for services.

Profile 500 can additionally include a location update interval element 526, which can be a duration of time (e.g., in seconds) between successive instances in time at which a location update should be performed by a wireless terminal while such terminal is in a "sleep" mode, for example. A monitoring interval element 528 can indicate a duration of time (e.g., in milliseconds) between successive instances in time at which monitoring for pages is to be performed by a wireless terminal while "sleep" mode. Profile 500 can additionally include a service set element 530 (described in detail below), which can include a set of service class and subscriber service logical data constructs that pertain to enabling and controlling services. Such element 530 can include QoS parameters relating to certain traffic flows associated with a particular terminal (e.g., wireless terminal). The element 530 also includes pre-authorization templates or data for dynamic quality of service configuration from an access node. The information comprising the profile, including the QoS parameters, can be conveyed using XML and the structure and other characteristics, e.g., data types, formats, and/or value restrictions, of the information can be defined by an associated XML schema.

Figure 6:
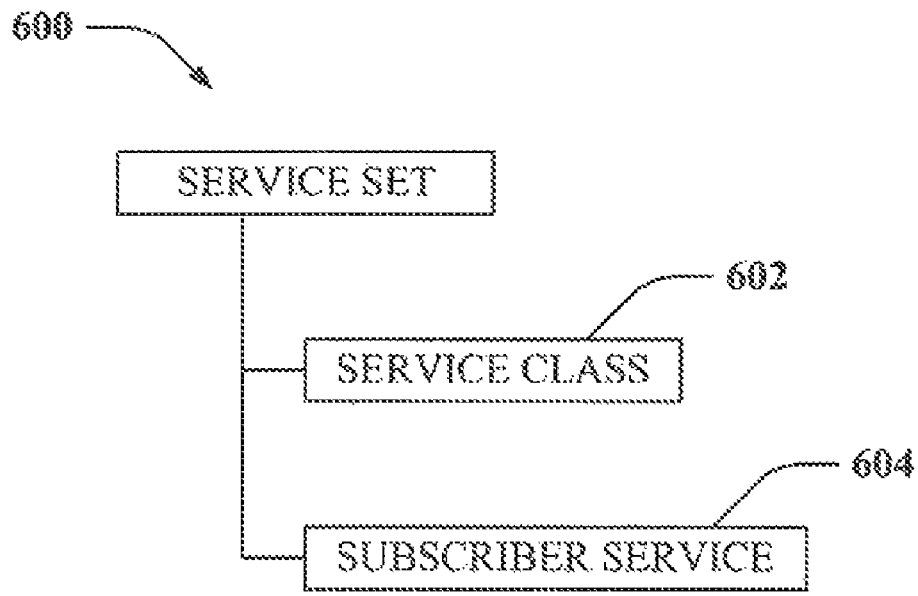
FIG. 6 illustrates an example format for a subscriber service set.

Now referring to FIG. 6, an example service set element 600 (such as service set element 530 of FIG. 5) is shown and described. It is to be understood, however, that such element is merely provided as an example, and that elements therein and/or logical associations between elements can be deleted, altered, and the like and remain in accordance with the claimed subject matter. QoS definition and control can be based at least in part upon two data constructs within service set element 600: a service class element 602 and a subscriber service element 604. While shown as a "subscriber" service element, it is understood that such element can relate to a subscriber device, e.g., wireless terminal. Thus, a subscriber service element can be included with a profile as a consequence of identifying indicia of a terminal and/or identifying indicia of a subscriber. Depending on the services to be provided the profile may include multiple occurrences of either or both of these data constructs. Service class element 602 (data construct) can provide a common mechanisms for prescribing QoS treatment of a traffic flow associated with an instance of a particular service class. For example, packets provided to/from a host device are classified into one or more traffic flows, where a given traffic flow may include only a specific packet stream corresponding to a particular application or may include an aggregation of packet streams corresponding to multiple applications.

Each identified traffic flow can then be associated with an instance of one or more service class elements (602). An associated service class of each identified traffic flow can provide a basis for admission control, scheduling, and traffic conditioning functions of a host device and/or an access node (access router, base station, etc.). While service class element 602 can pertain to QoS treatment, service set element 600 can pertain to policy control (e.g., authorization for services) and service definition (e.g., setting parameters values, association of identified traffic flows with instances of particular services classes to support QoS, . . . ). Each service set element can include zero or more service class elements and zero or more subscribers services elements.

Figure 7:
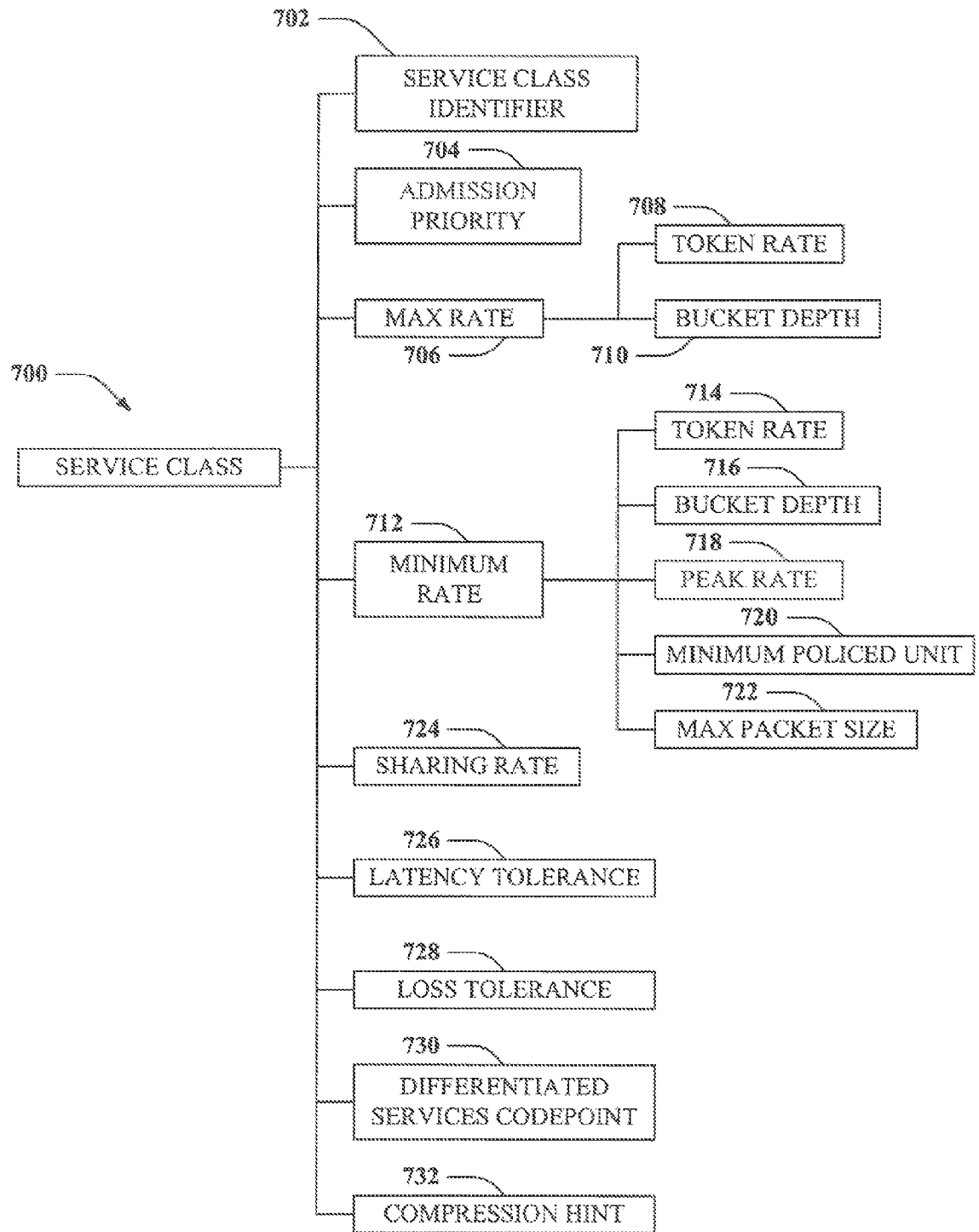
FIG. 7 illustrates an example format for a service class type.

Now turning to FIG. 7, an example service class element (such as service class element 602 shown in FIG. 6) is illustrated. Again, service class element 700 is provided as an example of one particular manner for defining QoS treatment within a profile. Other manners for doing so are contemplated by the inventors and are intended to fall under the scope of the hereto appended claims. Service class element 700 can include a service identifier 702, which can be a globally unique identifier (e.g., 32 bit) of a defined service class, which can be represented using a notation x:y, where x and y can be hexadecimal values corresponding to a first number of bits (prefix) and a second number of bits (suffix), respectively, of service class identifier 702. For example, a set of service classed defined by a particular operator or standards organization can utilize a common service class identifier prefix.

The service class element 700 can also include an admission priority element 704. For service classes that prescribed target delivery objectives requiring allocation of dedicated resources (e.g., service classes prescribing a minimum rate and/or latency bound), admission priority element 704 indicates a relative ordering of such service classes for purpose of making resource allocation admission control decisions. Specific use of admission priority can be implementation dependent, and possible uses include priority queuing of pending resource allocation requests and/or priority of preemption of resource allocations.

A max rate element 706 can indicate a maximum data rate that can be provided to a traffic flow associated with an instance of a particular service class. Maximum rate element 706 can be further defined by token bucket parameters, such as described within a token rate element 708 and a bucket depth element 710. Token rate element 708 can be in units of kilobits/second (where kilo indicates 1000), and bucket depth element 710 can be in units of byes, for instance.

A minimum rate element 712 can indicate a target minimum data rate to be provided to a traffic flow associated with an instance of a service class. Minimum rate element 712 can be further defined by a token rate element 714, a bucket depth element 716, a peak rate element 718, a minimum policed unit element 720, and a max packet size element 722. Token rate element 714 and peak rate element 718 can be in units of kilobits/second (where kilo indicates 1000), while bucket element 716, minimum policed unit element 720, and max packet size element 722 can be in units of bytes.

A sharing weight element 724 can be utilized to indicate a relative proportion of service (e.g., rate or resources) that a traffic flow associated with an instance of a service class should receive when competing for service with traffic flows associated with other service class instances. Thus, after the target delivery objectives (e.g., minimum rates and/or latency bounds) have been met for all admitted service class instances, any remaining service capacity should be distributed among competing service class instances that are not otherwise limited (e.g., by indicating maximum rate) proportionally to their corresponding sharing weights.

A latency tolerance element 726 indicates an acceptable access link latency for packets belonging to a traffic flow associated with an instance of a service class, where access link latency includes delays associated with queuing, scheduling, and transmission. With high probability, packets belonging to a traffic flow associated with an instance of the service class should be delivered over the access link with latency below the indicated tolerance. As an example, latency tolerance element 726 can be associated with units of milliseconds.

A loss tolerance element 728 can indicate an acceptable probability of loss for packets belonging to a traffic flow associated with an instance of a service class, where sources of loss include queue management and unrecoverable transmission errors. Packets belongings to a traffic flow associated with an instance of an identified service class should be delivered over the access link with loss probability below an indicated tolerance. The loss tolerance element 728 can include data relating to number of loss packets per 100,000 packets, for example. A differentiated services (DS) codepoint 730 can indicate a DS codepoint with which packets in a traffic flow associated with an instance of an identified service class should be marked.

A compression hint element 732 can indicate that header compression is likely applicable to packets belonging to a traffic flow associated with a particular instance of a service class. Compression hint element 732 can include information to assist in determining the applicable type of compression and/or parameters needed for compression.

Figure 8:
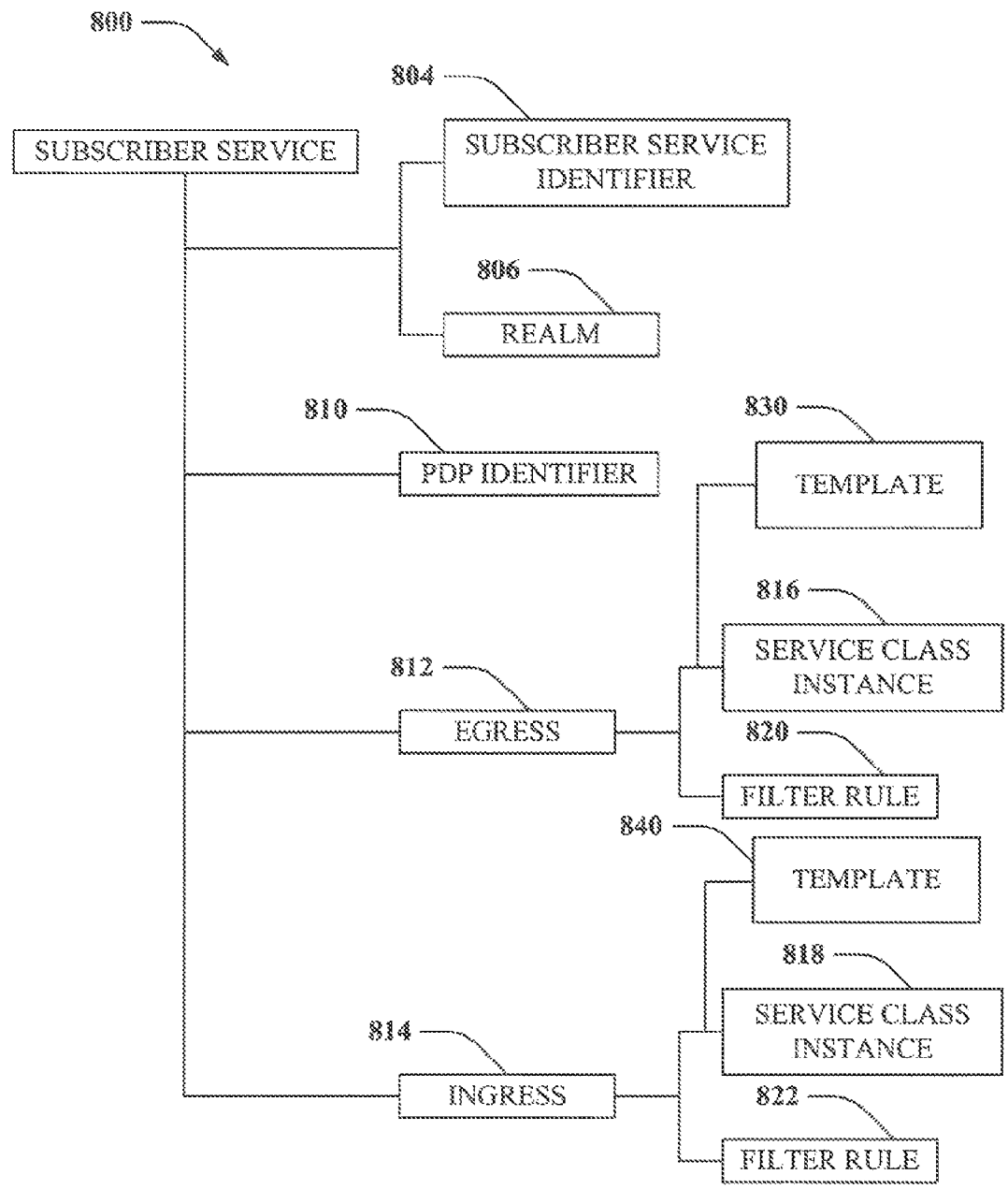
FIG. 8 illustrates an example subscriber service type.

With reference to FIG. 8, an example subscriber service element 800 (such as subscriber service element 604 of FIG. 6) is shown and described. Again, element 800 is provided as one particular manner for defining a service. Other manners for doing so are contemplated by the inventors and are intended to fall under the scope of the hereto appended claims. The subscriber service element 800 can include a subscriber service identifier element 804, which can be a globally unique identifier of a certain subscriber service, which can be represented using notation x:y, where x and y can be hexadecimal values corresponding to a first set of bits (prefix) and a last set of bits (suffix), respectively, of subscriber service identifier element 804. A set of subscriber services defined by a particular operator or standards body can a common subscriber service identifier prefix. A realm element 806 can indicate a domain with which a subscriber service is associated, wherein absence of realm element 806 can indicate that the subscriber service is associated with a local domain. This provides a basis for better controlling services when roaming between various network operators.

Subscriber service element 800 can include a Policy Decision Point (PDP) identifier element 810. A PDP identifier element 810 can be an identifier, such as an IP address or host name, of the PDP to be used for QoS configuration change requests associated with a particular subscriber service. The subscriber service element 800 can additionally include an egress element 812, which is a logical grouping of service class instances, filter rules, and service class instance templates applicable to egress traffic from an access router to a subscriber over a corresponding access link, and an ingress element 814, which is a logical grouping of service class instances, filter rules, and service class instance templates that are applicable to ingress traffic to an access router from a subscriber over a corresponding access link.

Egress element 812 and ingress element 814 can each include one or more service class instance elements 816 and 818, respectively. Service class instance elements 816 and 818 can define static service class instances, e.g., identify a particular service class element of which an instance is required and with which a traffic flow will be associated by one or more filter rules. A static service class instance can conceptually be viewed as a persistently requested instance of a particular service class. Depending upon parameters of a corresponding service class, an admission control decision may be required. Thus, at any given point in time a static service class instance may or may not be acted (e.g., admitted), depending upon resource availability and admission priority, but should be made active whenever possible.

Egress element 812 and ingress elements 814 can also each include one or more filter rule elements 820 and 822, respectively. Filter rule elements 820 and 822 define a classifier filter rule for the purpose of mapping packets belonging to a traffic flow with a defined service class instance. Each filter rule element can include a priority indicating the order in which it should be applied with respect to other filter rule elements, specification of packet matching criteria (e.g., values or ranges of values corresponding to one or more packet header or payload fields), and an indication of the service class instance with which matching packets should be associated. Filter rule elements 820 and 822 can also be used to discard packets belonging to a traffic flow by mapping them to an instance of a null service class.

Egress element 812 and ingress element 814 can also each include one or more service class instance template elements 830 and 840, respectively. Service class instance template elements 830 and 840 prescribe pre-authorization for dynamic service class instances, e.g., identify a particular service class element of which an instance may be dynamically requested as well as prescribe policy constraints regarding the requested service class instance and/or the filter rules used to associate traffic flows with the requested service class instance.

Figure 9:
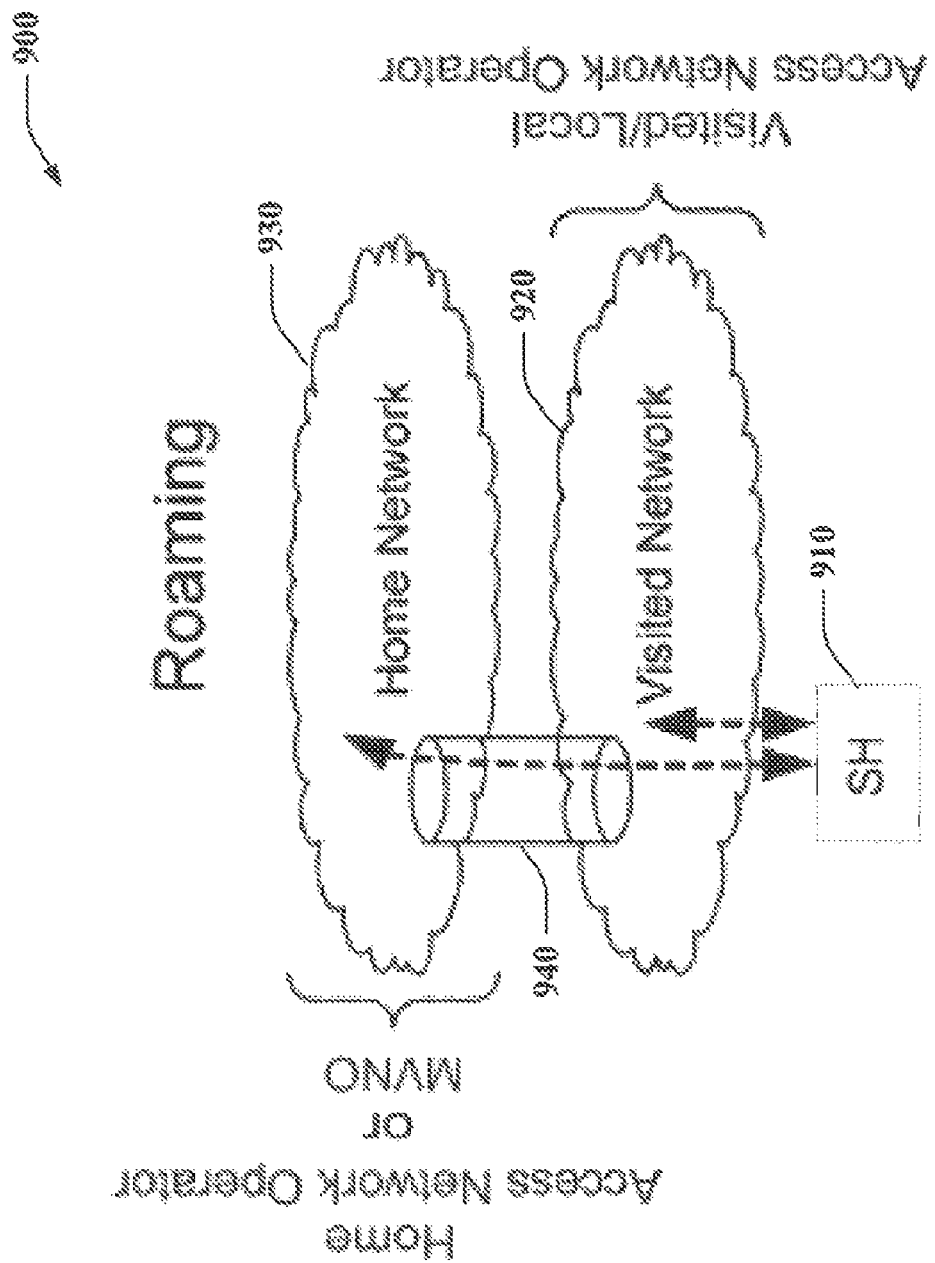
FIG. 9 illustrates a general roaming example.

Referring to FIG. 9, an example roaming system 900 is illustrated that can employ the modifiable profiles described above. The system 900 illustrates a roaming scenario, where a subscriber host (SH) 910 obtains access via a visited network 920, i.e., a network other than its home network 930. In this example, there can typically be a roaming agreement 940 between the home network and visited network operators. The home network operator can typically be involved with authentication of the SH 910 and granting authorization for access. Assuming that the home operator grants access to the SH 910, the visited network operator can enable the SH to obtain services via its local access network. However, basic network service and higher layer service could be provided by either network operator or both. The dashed lines in the system 900 conceptually represent basic network services and/or higher layer services. When roaming, it is possible for the SH 910 to receive services from the visited/local domain 920, home network or domain 930, or both. Thus, subscriber service mechanisms (e.g., a subscriber profile indicating authorization for services) should provide sufficient information to enable support of services by either domain. The scenario system 900 may also represent one example of a Mobile Virtual Network Operator (MVNO), e.g., the case where the home network 930 is an MVNO. In this case, the MVNO may include the required network elements and software to support "roaming", but not include an access network. Thus, while SH 910 is administratively associated with the MVNO, it can not directly access the home network 930 and appears to be roaming via the visited network 920.

Figure 10:
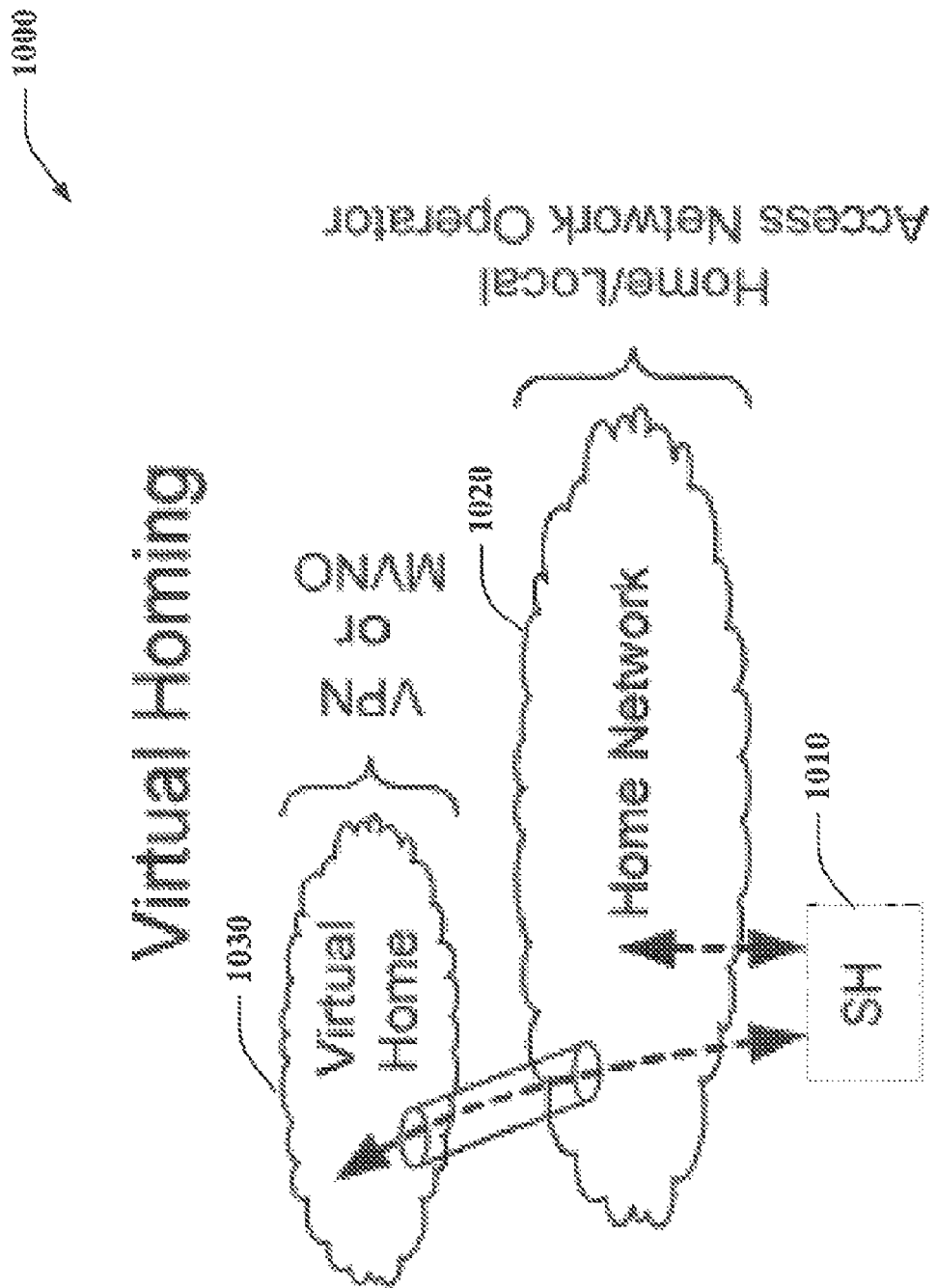
FIG. 10 illustrates a virtual homing example.

Referring to FIG. 10, a system 1000 illustrates a virtual homing scenario. The virtual homing scenario depicted by the system 1000 represents another example of supporting an MVNO, e.g., the case where the virtual home 1030 is an MVNO, and also represents an example of supporting a Virtual Private Network (VPN), e.g., the case where the virtual home 1030 is a private network. The general distinction from the system 900 described above, is in the system 1000, an SH 1010 is administratively associated with a local network 1020 through which it obtains access, i.e., the local network 1020 is the home network. Thus, the local/home network operator would typically be involved with authentication of the SH 1010 and granting authorization for access. However, the SH 1010 also has an association with a depicted virtual home 1030, which could be a MVNO or a private, e.g., corporate, entity for which a VPN service is to be provided. As in the system 900, dashed lines are depicted, indicating that basic network service, e.g., addressing/routing, as well as potentially higher layer services may be provided by the home/local domain 1020, the virtual home domain 1030, or both.

Figure 11:
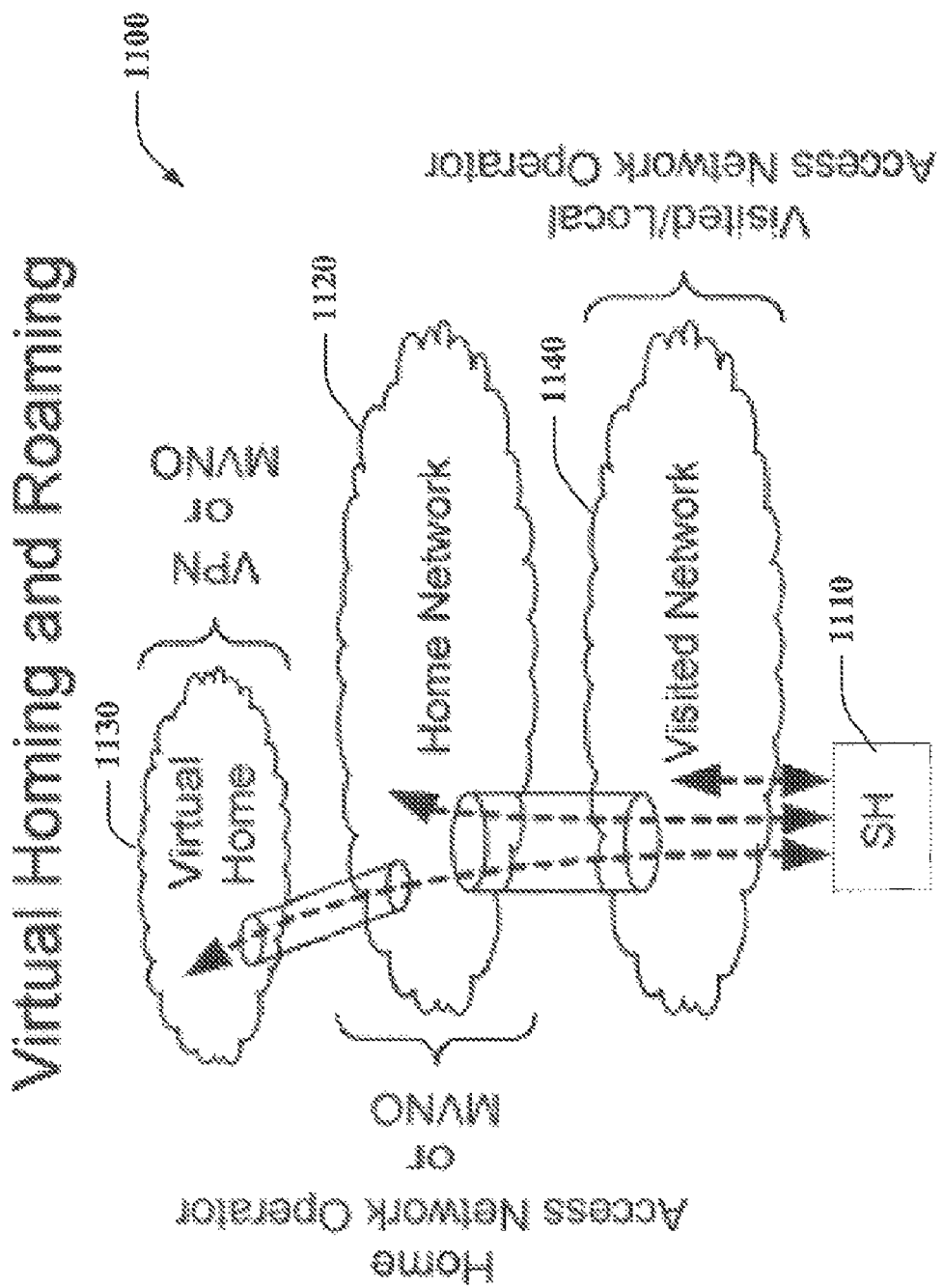
FIG. 11 illustrates a virtual homing and roaming example.

Referring to FIG. 11, a system 1100 illustrates a virtual homing and roaming scenario. The system 1100 represents a combination of those depicted in the systems 900 and 1000 described above. In this example, an SH 1110 is associated with a home network 1120 and a virtual home 1130 while obtaining access via a visited network 1140. Again, a home network operator would typically be involved with authentication of the SH 1110 and granting authorization for access. However, in this system 1100, three dashed arrow are depicted, indicating that basic network service, e.g., addressing/routing, as well as potentially higher layer services may be provided by the visited/local domain 1140, the home domain 1120, the virtual home domain 1130, or a combination of the three domains.

Figure 12:
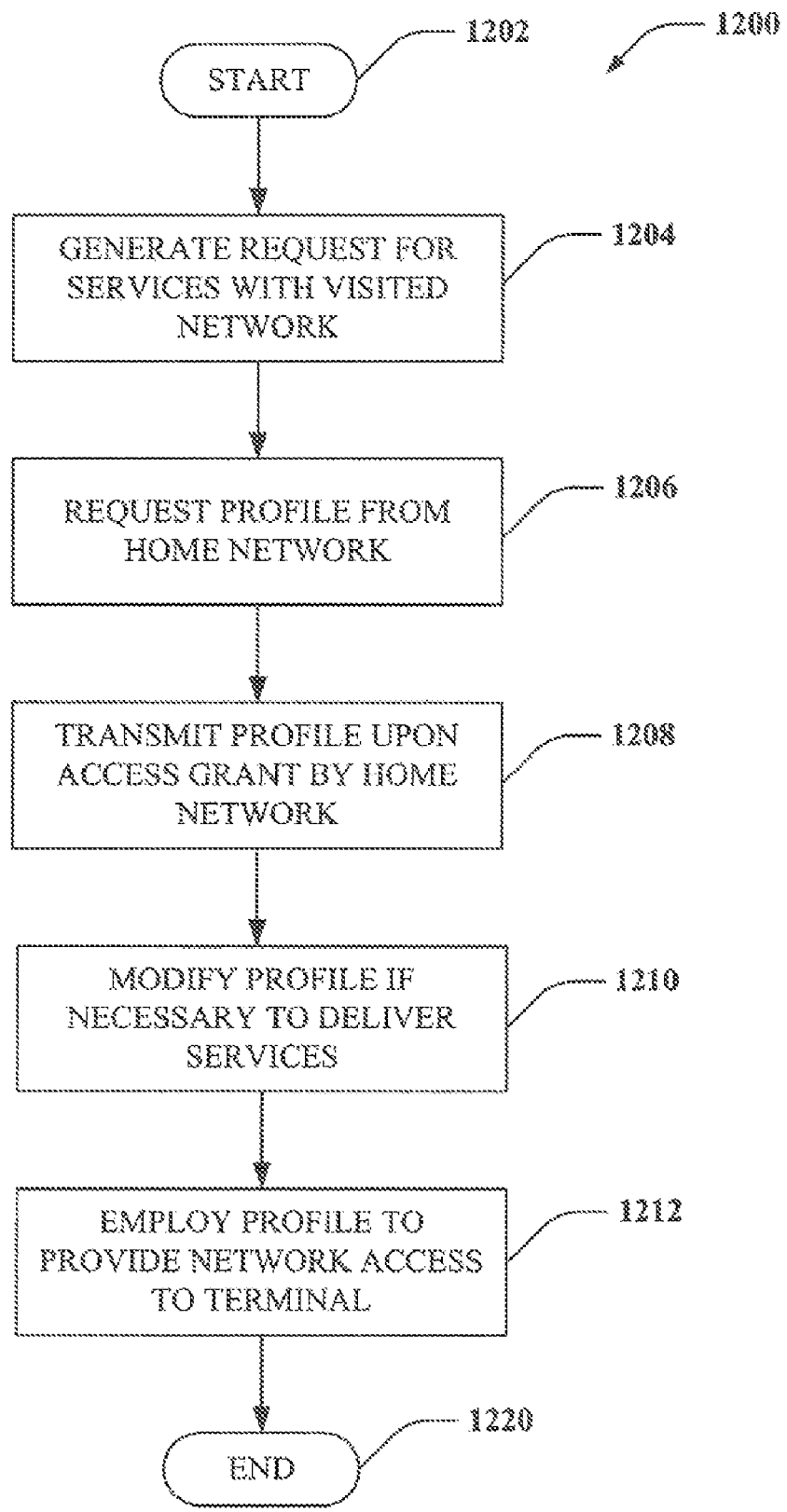
FIG. 12 is a representative flow diagram illustrating a methodology for roaming and profile processing.

Referring to FIG. 12, a methodology 1200 relating to profile modification and roaming is illustrated. While, for purposes of simplicity of explanation, the methodology is shown and described as a series of acts, it is to be understood and appreciated that the methodology is not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Referring specifically to FIG. 12, the methodology 1200 is illustrated. The methodology 1200 begins at 1202, where a request is generated at 1204 for services from a visited network. For example, a mobile terminal may have initially been authorized through a home network and now due to its location, the mobile terminal is now requesting access from a subsequent network sometimes referred to as the visited network or domain. At 1206, a profile is requested from the home network. Such request can be generated by the visited network in response to the request for services at 1204. The profile may currently specify services such as Quality of Service parameters for example that are supported when the terminal was authorized by the home network. At 1208, the profile is transmitted from the home network to the visited network upon generating an access grant by the home network. As noted previously, the home network can include virtual aspects such as provided by Mobile Virtual Network Operator (MVNO) or other virtual private network component.

The access grant may occur after handshaking signals or codes have been exchanged between the home network and the visited network. At 1210, the received profile can be left unchanged or modified if desired. Profile modifications can include adding services to the profile, deleting services from the profile, and/or adjusting parameters relating to a respective service within the profile. Thus, the visited network can offer similar services to the home network in view of the received profile, a reduced set of services if the profile has one or more services deleted from the profile, or a superset of services, if the visited network adds services to the received profile. At 1212, the profile is employed to offer a desired set of services to the wireless access terminal.

Figure 13:
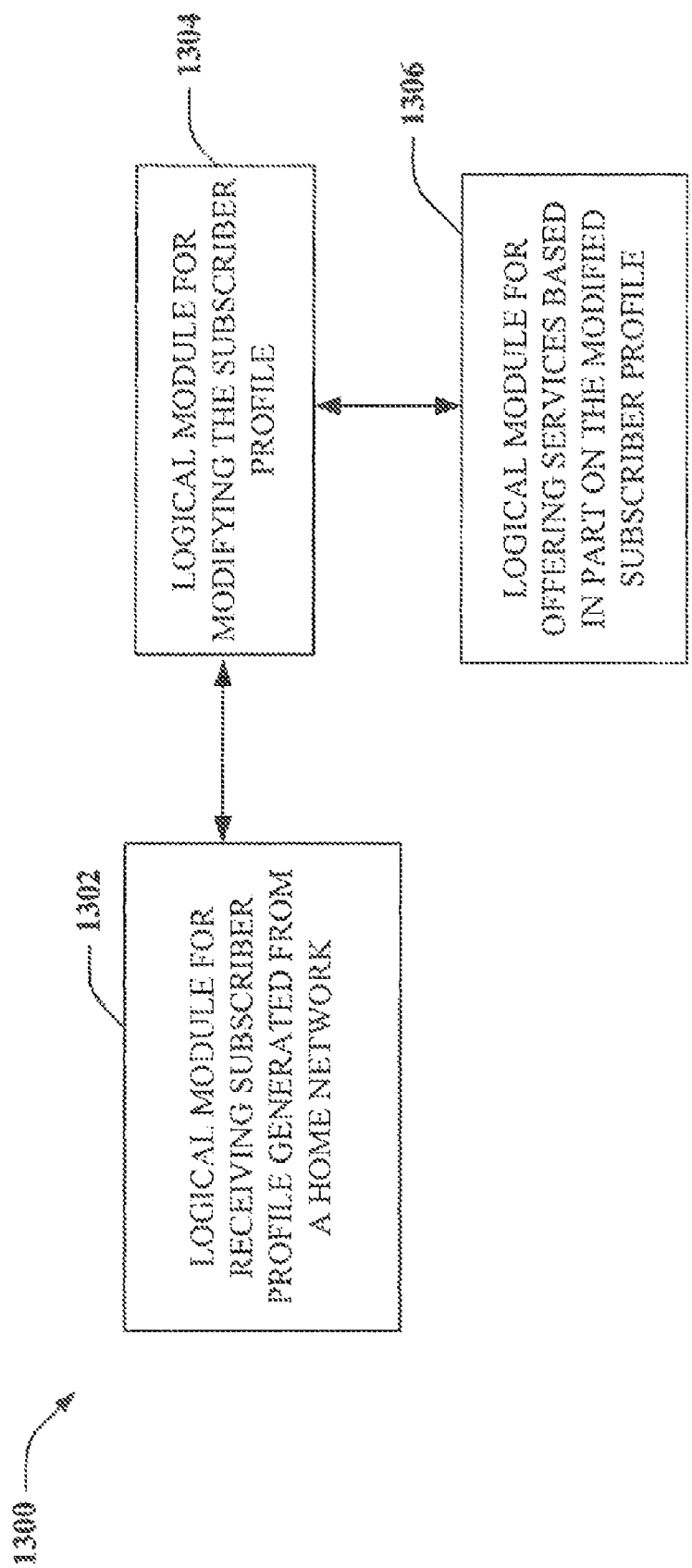
FIGS. 13 and 14 is a high level block diagram of a system for providing profile support during roaming operations.
Figure 14:
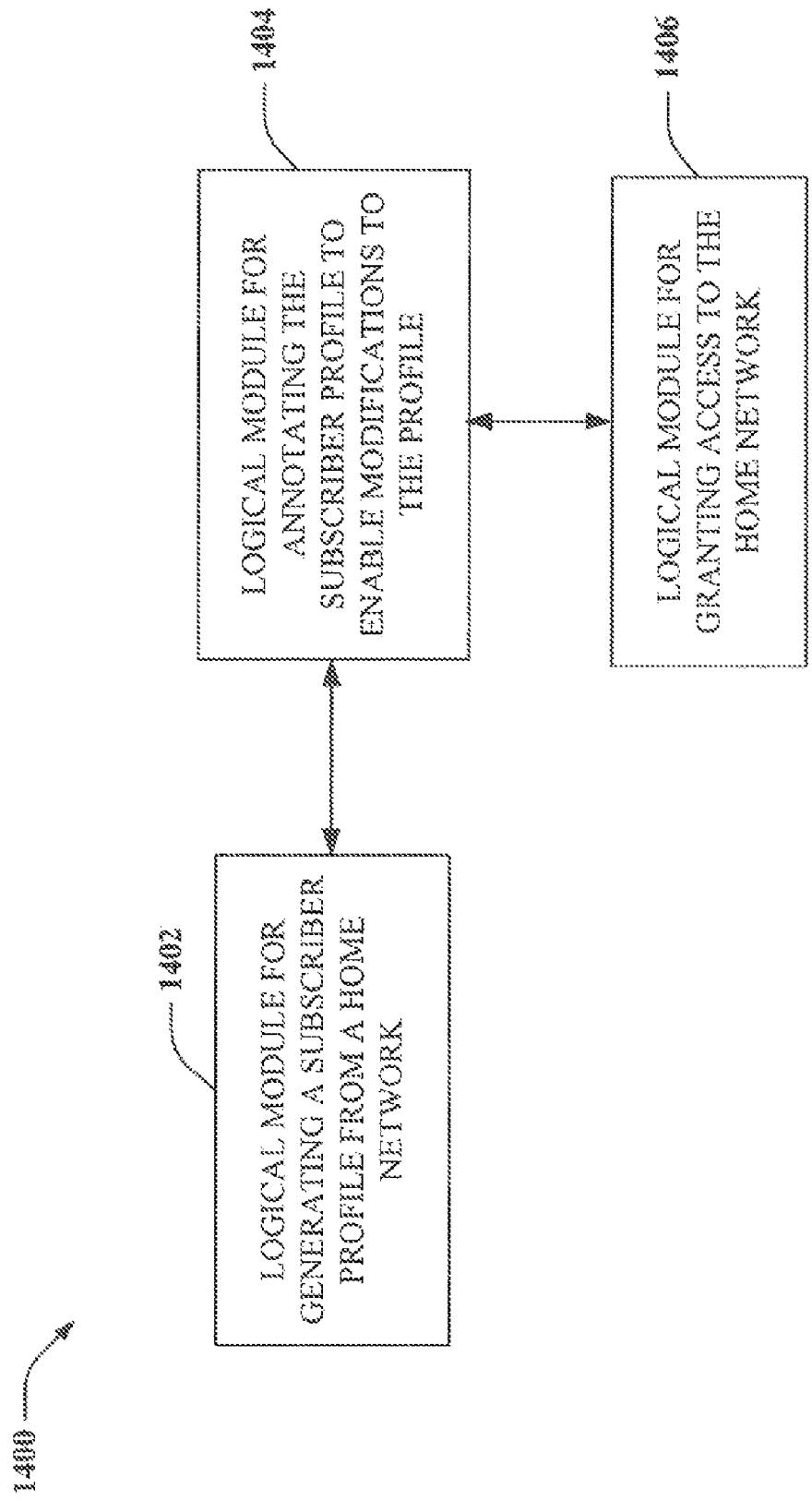

Turning now to FIGS. 13 and 14 collectively, systems are provided that relate to profile modification and roaming with respect to a terminal, operator networks, access nodes, and traffic flows therewith. The systems are represented as a series of interrelated functional blocks, which can represent functions implemented by a processor, software, hardware, firmware, or any suitable combination thereof.

Referring specifically to FIG. 13, a system 1300 that facilitates communications from a visited network. The system 1300 includes a logical module 1302 for receiving subscriber profile generated from a home network. A logical module 1304 is employed for modifying the subscriber profile and a logical module 1306 is utilized for offering services based in part on the modified subscriber profile. Modifying the subscriber profile can include adding or deleting services from the profile or modifying/editing parameters within the profile.

Now referring to FIG. 14, a system 1400 that facilitates communications from a home network in a roaming environment. The system 1400 includes a logical module 1402 for generating a subscriber profile from a home network. This includes a logical module 1404 for annotating the subscriber profile to enable modifications to the profile and a logical module 1406 for granting access to the home network.

Figure 15:
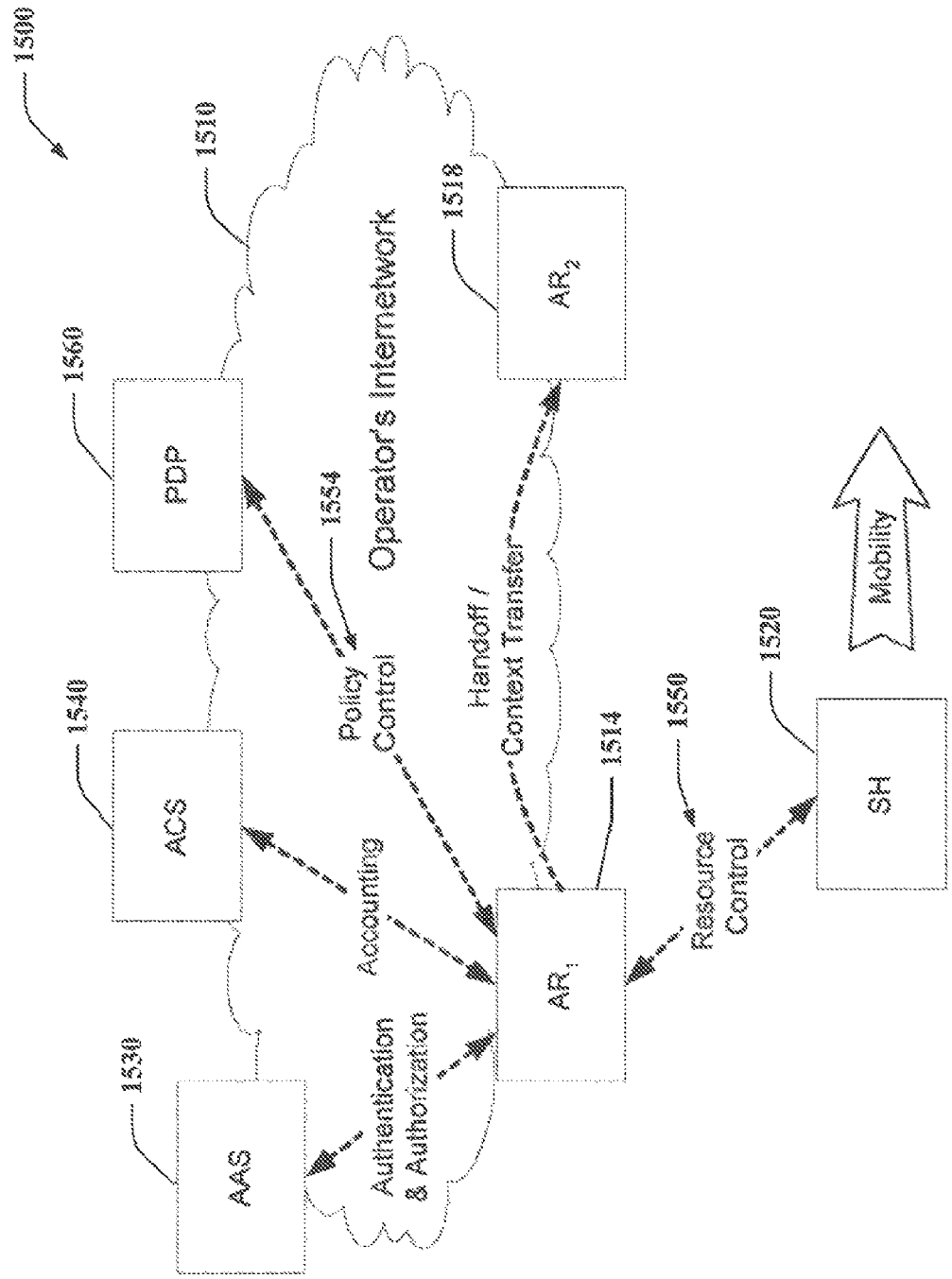
FIG. 15 is a block diagram of system that is provided to illustrate an example network that can support profile modifications.

Referring to FIG. 15, an example network 1500 is illustrated that can employ profile data for roaming between networks. The system 1500 depicts an operator's inner-network 1510 with two Access Routers (ARs) 1514 and 1518, through which a Subscriber Host (SH) 1520 may obtain access, and several additional network elements. Logical interfaces between the various elements are indicating using dashed lines. The ARs 1514-1518 are network elements in the context of service control, since they are positioned to control access to services available via the operator's infrastructure and to directly control QoS for such services over the access links. However, a number of other network elements likely also play a role in a complete solution, e.g., to control the operation of the ARs 1514-1518. The following description addresses each of the logical interfaces, as well as the associated network elements, shown in the system 1500.

A trusted indication of subscriber identify (or a subscriber identity associated with the SH 1520) is fundamental to the notion of controlling services on an individual subscriber basis. Typically, a subscriber's indicated identity is authenticated, e.g., using an Extensible Authentication Protocol (EAP), prior to being granted access to the network and higher layer services. This initial authentication and authorization process commonly involves communication between the element through which access is being requested, e.g., the AR 1514-1518, and a separate Authentication and Authorization Server (AAS) 1530, e.g., using a Remote Dial-In User Service (RADIUS) protocol. Provided that the subscriber's identity is authenticated by the AAS 1530 and the subscriber 1520 is authorized to obtain access, an indication that access may be granted is returned from the AAS 1530 to the element through which access is being requested.

Following an initial access grant, the AR 1514-1518 may begin sending accounting information, e.g., packet/byte counts, to an Accounting Server (ACS) 1540. Accounting for traditional IP best effort service often consists of only simple aggregate packet/byte counts for traffic sent/received. However, supporting a richer set of subscriber services also likely employs accounting mechanisms that enable service-based billing and charging. Thus, accounting information, e.g., collected/reported by the AR 1514-1518, should include details regarding the services used and/or the level of QoS provided.

In accordance with the architecture presented herein, the SH 1520 may change its point of attachment from one AR to another, a process generally referred to as handoff. Mobile IP (MIP) is one approach to supporting mobility in IP internetworks, using tunnels to manage routing/forwarding thus allowing a mobile host to continue using the same address as it changes its point of attachment. A mechanism for Context Transfer (CT) can be employed to minimize service disruption upon handoff. By transferring information about service authorization and QoS configuration between ARs upon handoff, equivalent service can more quickly and efficiently be established via the new AR. Note that upon receiving QoS configuration information associated with a SH 1520 moving to a new AR, the new AR should perform admission control to determine if sufficient resources are available prior to provided the indicated service.

A resource control interface 1550 employs a signaling protocol by which the SH 1550 may request QoS configuration changes following initial access grant. As noted above, this may include a set of available QoS data and parameters that can be requested by the SH 1520 as dynamic conditions require. In general, one cannot assume that end-to-end QoS is supported between the SH 1520 and another host with which the SH is communicating. However, the system 1500 provides a QoS architecture wherein, for a wide range of services, resource reservation is only required in the AR 1514-1518 and not along the entire data path. In cases where resource reservation is required in additional nodes along the data path, alternative or additional resource control signaling may be used. In accordance with the model, the SH 1520 should be able to request resources for traffic both sent and received. While the system 1500 depicts the resource control interface 1550 between the SH 1520 and AR, it is also possible to suppport QoS configuration, via an equivalent or similar resource control interface, from elements in the operator's inter-network 1510, an operator host (OH) or application server, on behalf of the SH.

A policy control interface 1554 represents a mechanism by which authorization may be checked for QoS configuration changes, e.g., requested via the resource control interface 1550. Note that the policy control interface 1554 is depicted between the AR 1514 and a non-specific network element functioning as a PDP 1560, where the PDP function could be located in a dedicated policy server, an application server, or some other network element, for example. A possible reason for this distinction is that the appropriate placement of the PDP function 1560 may be dependent on a particular service. In general, different services may even be associated with different PDP's, thus in accordance with some embodiments of the invention a service definition includes an indication of the associated PDP.

Figure 16:
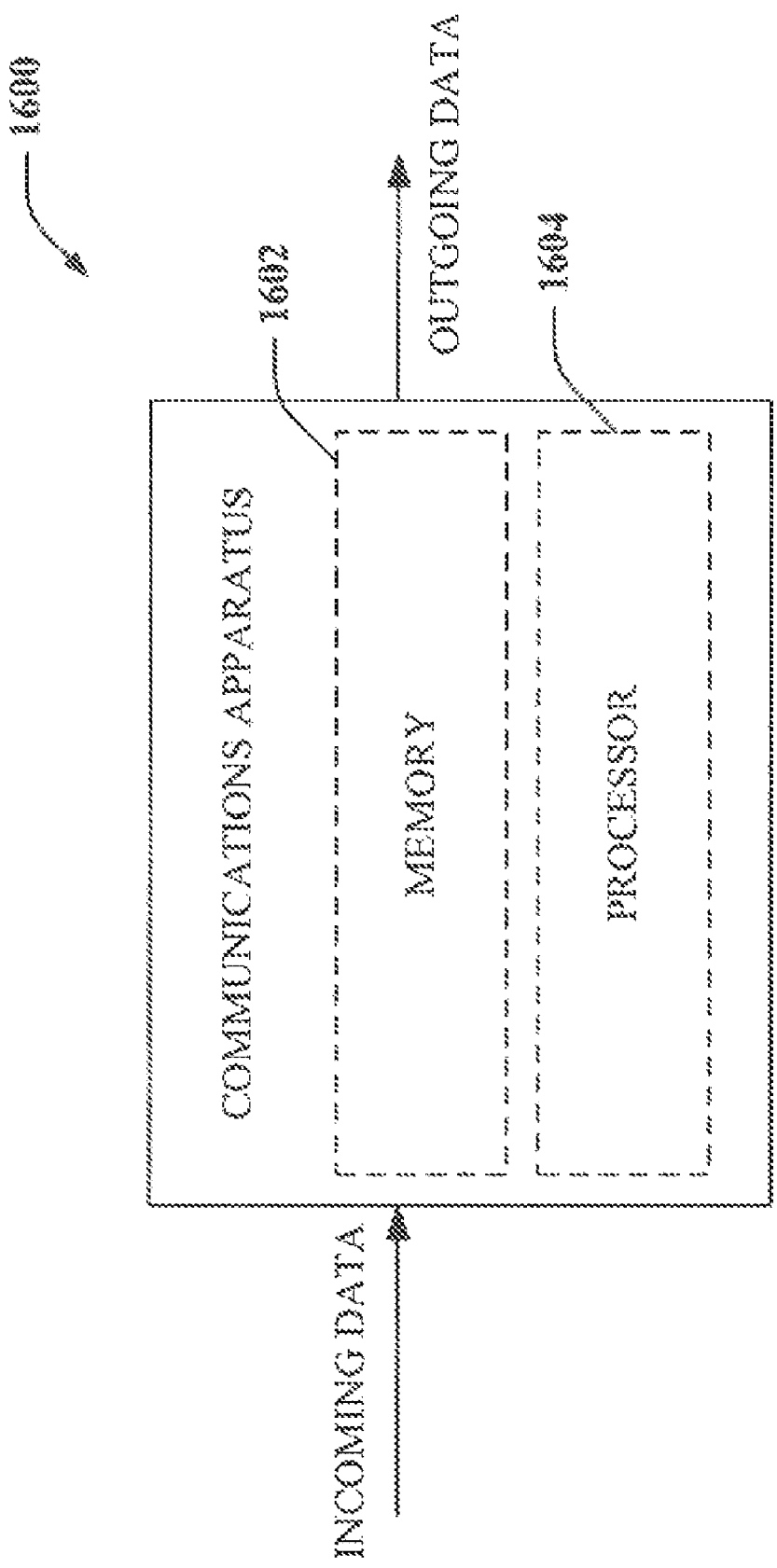
FIG. 16 is a block diagram of an apparatus to process profile and/or QoS parameters.

FIG. 16 illustrates a communications apparatus 1600 that can be a wireless communications apparatus, for instance, such as a wireless terminal. Additionally or alternatively, communications apparatus 1600 can be resident within a wired network. Communications apparatus 1600 can include memory 1602 that can retain instructions for configuring such apparatus with respect to QoS data for a terminal (and traffic flows associated therewith). Additionally, communications apparatus 1600 may include a processor 1604 that can execute instructions within memory 1602 and/or instructions received from another network device, wherein the instructions can relate to configuring communications apparatus 1600 or a related communications apparatus.

The memory 1602 retains instructions for receiving a profile associated with one or more services, where the profile can associated with a home network component and modifiable via a visited network component, the profile employed to offer services to a roaming access terminal. In another aspect, the memory retains instructions for generating a profile associated with one or more services, where the profile can be associated with a home network component and modifiable via a services description component. The profile can be employed to offer services to a roaming access terminal, for example.

Figure 17:
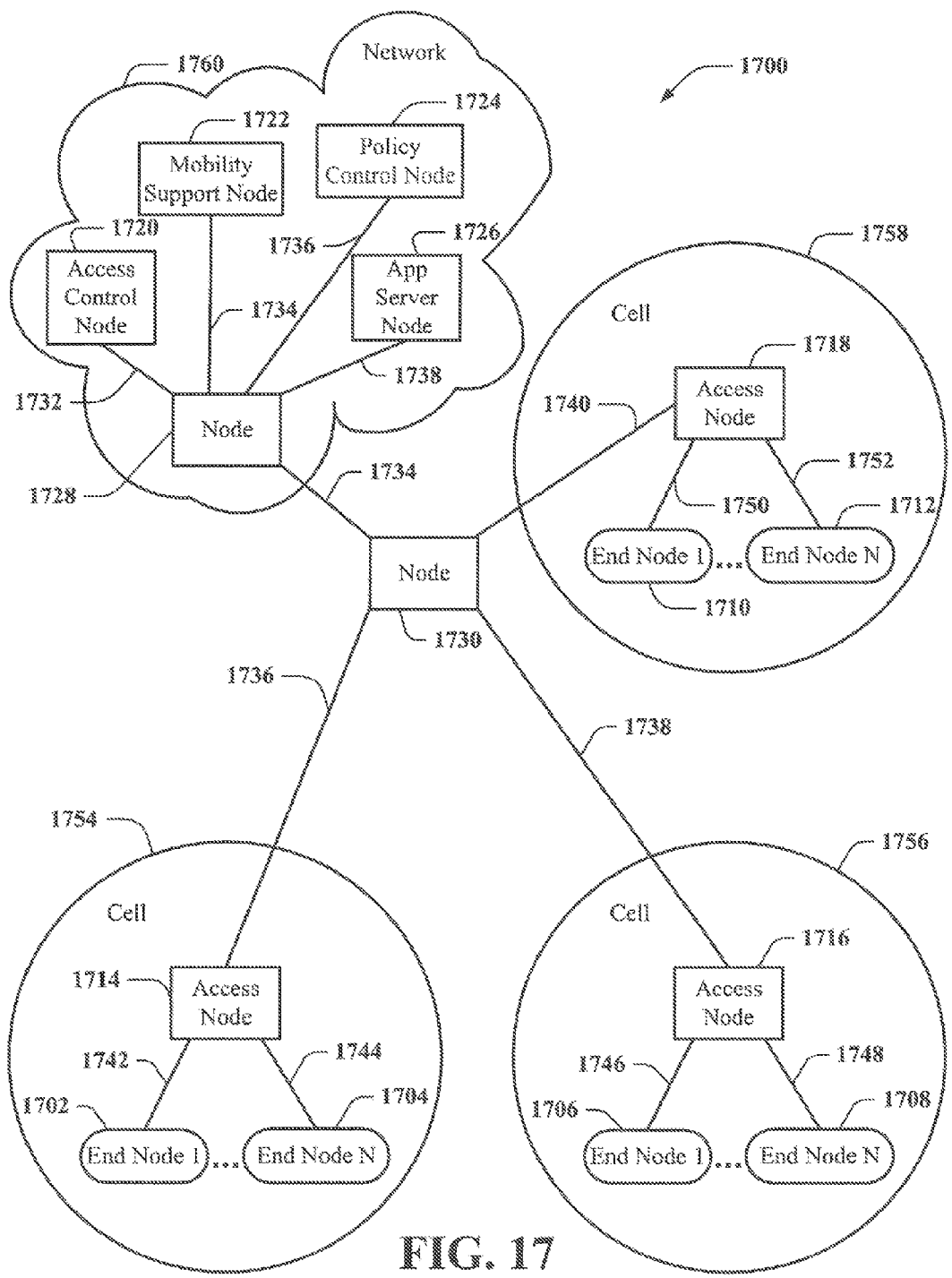
FIG. 17 illustrates an example communications system.

To provide additional context for one or more embodiments described herein, FIG. 17 is provided to illustrate an example communication system 1700 that comprises a plurality of nodes interconnected by communications links. The system 1700 may use Orthogonal Frequency Division Multiplexing (OFDM) signals to communicate information over wireless links. However, other types of signals, e.g., Code Division Multiple Access (CDMA) signals or Time Division Multiple Access (TDMA) signals, are also contemplated (together with signals utilized in land-based networks). Nodes in the communication system 1700 exchange information using signals, e.g., messages, based on communication protocols, e.g., the Internet Protocol (IP). The communications links of the system 1700 may be implemented, for example, using wires, fiber optic cables, and/or wireless communications techniques. The system 1700 includes a plurality of end nodes 1702-1712, which access the communication system 1700 by way of a plurality of access nodes 1714-1718. End nodes 1702-1712 may be, e.g., wireless communications devices or terminals, and the access nodes 1714-1718 may be e.g., wireless access routers or base stations. Communication system 1700 also includes a number of other nodes 1720-1730 that are used to provide interconnectivity or to provide specific services or functions.

Communications system 1700 depicts a network 1760 that includes access control node 1720, mobility support node 1722, policy control node 1724, and application server node 1726, all of which are connected to an intermediate network node 1728 by a corresponding network link 1732-1738, respectively. In some embodiments, the access control node, e.g., a Remote Authentication Dial In User Service (RADIUS) or Diameter server, supports authentication, authorization, and/or accounting of end nodes and/or services associated with end nodes. In some embodiments, mobility support node 1722, e.g., a Mobile IP home agent and/or context transfer server, supports mobility, e.g., handoff, of end nodes between access nodes, e.g., by way of redirection of traffic to/from end nodes and/or transfer of state associated with end nodes between access nodes. In some embodiments, policy control node 1724, e.g., a policy server or Policy Decision Point (PDP), supports policy authorization for services or application layer sessions. In some embodiments, application server node 1726, e.g., a Session Initiation Protocol server, streaming media server, or other application layer server, supports session signaling for services available to end nodes and/or provides services or content available to end nodes.

Intermediate network node 1728 in network 1760 provides interconnectivity to network nodes that are external from the perspective of network 1760 by way of network link 1734. Network link 1734 is connected to intermediate network node 1730, which provides further connectivity to access nodes 1714, 1716, and 1718 by way of network links 1736-1740, respectively. Each access node 1714-1718 is depicted as providing connectivity to end nodes 1702-1712, respectively, by way corresponding access links 1742-1752, respectively. In communication system 1700, each access node 1714-1718 is depicted as using wireless technology, e.g., wireless access links, to provide access. Wired technology may also be utilized, however, in connection with provision of access. A radio coverage area, e.g., communications cells 1754-1758 of each access node 1714-1718, is illustrated as a circle surrounding the corresponding access node.

Communication system 1700 can be used as a basis for the description of various embodiments described herein. Alternative embodiments include various network topologies, where a number and type of nodes (including network nodes, access nodes, end nodes, as well as various control, support, and server nodes), a number and type of links, and interconnectivity between various nodes may differ from that of communication system 1700. Additionally, some of the functional entities depicted in communication system 1700 may be omitted or combined. Location or placement of these functional entities may also be varied.

Figure 18:
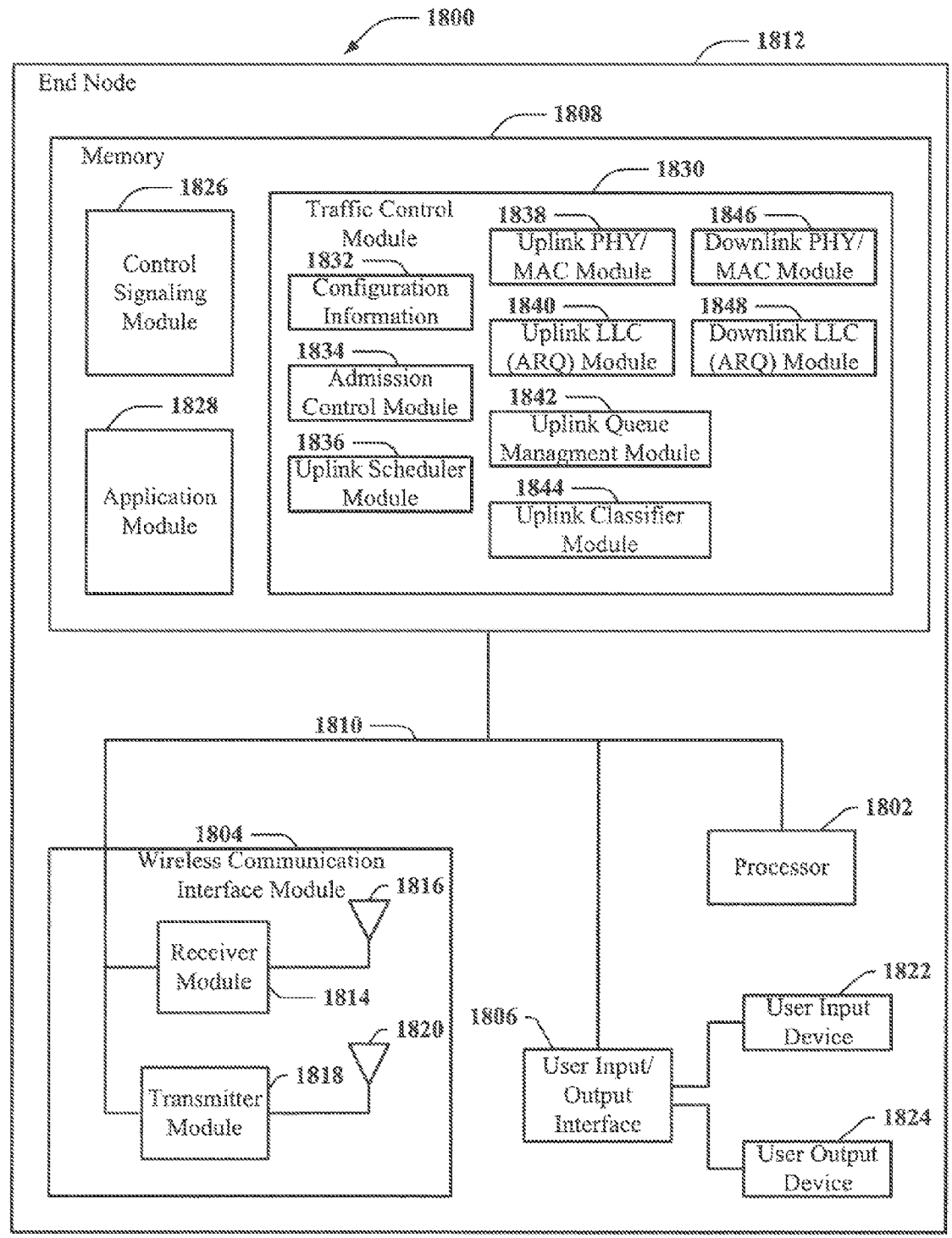
FIG. 18 illustrates an example end node.

FIG. 18 provides an illustration of an example end node 1800, e.g., wireless terminal. End node 1800 is a representation of an apparatus that may be used as any one of end nodes 1702-1712 (FIG. 17). End node 1800 includes a processor 1802, a wireless communication interface module 1804, a user input/output interface 1806 and memory 1808 coupled together by a bus 1810. Accordingly, by way of bus 1810, the various components of the end 1800 can exchange information, signals and data. Components 1802-1808 of end node 1800 can be located inside a housing 1812.

Wireless communication interface module 1804 provides a mechanism by which the internal components of end node 1800 can send and receive signals to/from external devices and network nodes, e.g., access nodes. Wireless communication interface module 1804 includes, e.g., a receiver module 1814 with a corresponding receiving antenna 1816 and a transmitter module 1818 with a corresponding transmitting antenna 1820 used for coupling end node 1800 to other network nodes, e.g., by way of wireless communications channels.

End node 1800 also includes a user input device 1822, e.g., keypad, and a user output device 1824, e.g., display, which are coupled to bus 1810 through user input/output interface 1806. Thus, user input/output 1822 and 1824 can exchange information, signals and data with other components of end node 1800 by way of user input/output interface 1806 and bus 1810. User input/output interface 1806 and associated devices 1822 and 1824 provide mechanisms by which a user can operate end node 1800 to accomplish various tasks. In particular, user input device 1822 and user output device 1824 provide functionality that allows a user to control end node 1800 and applications, e.g., modules, programs, routines and/or functions, that execute in memory 1808 of end node 1800.

Processor 1802, under control of various modules, e.g., routines, included in memory 1808 controls operation of end node 1800 to perform various signaling and processing. The modules included in memory 1808 are executed on startup or as called by other modules. Modules may exchange data, information, and signals when executed. Modules may also share data information when executed. Memory 1808 of end node 1800 includes a control signaling module 1826, an application module 1828, and a traffic control module 1830, which further includes configuration information 1832 and various additional modules.

Control signaling module 1826 controls processing relating to receiving and sending signals, e.g., messages, for controlling operation and/or configuration of various aspects of end node 1800 including, e.g., traffic control module 1830 as well as configuration information 1832 and various additional modules included. In some embodiments, control signaling module 1826 can include state information, e.g., parameters, status and/or other information, relating to operation of end node 1800 and/or one or more signaling protocols supported by control signaling module 1826. In particular, control signaling module 1826 may include configuration information, e.g., end node identification information and/or parameter settings, and operational information, e.g., information about current processing state, status of pending message transaction, etc.

Application module 1828 controls processing and communications relating to one or more applications supported by end node 1800. In some embodiments, application module 1828 processing can include tasks relating to input/output of information by way of the user input/output interface 1806, manipulation of information associated with an application, and/or receiving or sending signals, e.g., messages, associated with an application. In some embodiments, application module 1828 includes state information, e.g., parameters, status and/or other information, relating to operation of one or more applications supported by application module 1828. In particular, application module 1828 may include configuration information, e.g., user identification information and or parameter settings, and operational information, e.g., information about current processing state, status of pending responses, etc. Applications supported by application module 1828 include, e.g., Voice over IP (VoIP), web browsing, streaming audio/video, instant messaging, file sharing, gaming, etc.

Traffic control module 1830 controls processing relating to receiving and sending data information, e.g., messages, packets, and/or frames, through wireless communication interface module 1804. The example traffic control module 1830 includes configuration information 1832 as well as various additional modules that control various aspects of QoS for packets and/or traffic flows, e.g., associated sequences of packets. Various additional modules are included, in some embodiments, to perform particular functions and operations as needed to support specific aspects of traffic control. Modules may be omitted and/or combined as needed depending on the functional requirements of traffic control. A description of each additional module included in traffic control module 1830 follows.

An admission control module 1834 maintains information relating to resource utilization/availability and determines if sufficient resources are available to support QoS parameters desirably associated with particular traffic flows. Resource availability information maintained by admission control module 1834 includes, e.g., packet and/or frame queuing capacity, scheduling capacity, as well as processing and memory capacity needed to support one or more traffic flows. Control signaling module 1826, application module 1828, and/or other modules included in the end node 1800 may query admission control module 1834 to determine if sufficient resources are available to support a new modified traffic flow, where the admission control determination is a function of QoS parameters of the particular traffic flow and QoS parameters defined within a profile. Configuration information 1832 can include configuration information, e.g., parameters settings, that affect the operation of admission control module 1834, e.g., an admission control threshold value that indicates percentage of resource that may be allocated prior to rejecting additional requests.

An uplink scheduler module 1836 controls processing relating to transmission scheduling, e.g., order and/or timing, and allocation of transmission power, for data information coding rate, transmission time slots, and/or transmission wireless communication interface module 1804, e.g., from end node 1800 to an access node. Uplink scheduler module 1836 can schedule transmissions and allocate transmission resources as a function of QoS parameters associated with one or more traffic flows. In some embodiments, scheduling and/or resource allocation operations performed by uplink scheduler module 1836 are additionally a function of channel conditions and other factors, e.g., power budget.

An uplink PHY/MAC module 1838 controls physical (PHY) layer and Media Access Control (MAC) layer processing relating to sending data information, e.g., messages, packets, and/or frames, by way of wireless communication interface module 1804, e.g., from end node 1800 to an access node. For instance, operation of uplink PHY/MAC module 1838 includes both sending and receiving control information, e.g., signals or messages, to coordinate sending of data information, e.g., messages, packets, and/or frames. Configuration information 1832 can include configuration information, e.g., parameters settings, that affect the operation of uplink PHY/MAC module 1838, e.g., a frequency, band, channel, spreading code or hoping code to be used for transmissions, an identifier associated with end node 1800, a request dictionary prescribing use of an assignment request channel, etc.

An uplink LLC (ARQ) module 1840 controls Logical Link Control (LLC) layer processing relating to sending data information, e.g., messages, packets, and/or frames, through wireless communication interface module 1804, e.g., from end node 1800 to an access node. Uplink LLC (ARQ) module 1840 includes processing associated with Automatic Repeat Request (ARQ) capabilities, e.g., retransmission of lost packets or frames. Uplink LLC (ARQ) module 1840 can, for instance, further include processing relating to addition of an LLC header and/or trailer to higher layer messages, e.g., packets, to provide additional functionality, e.g., multi-protocol multiplexing/demultiplexing by way of a type field or error detection through utilization of a checksum field. Uplink LLC (ARQ) module 1840 can additionally perform fragmentation of higher layer messages, e.g., packets, into multiple sub-portions, e.g., frames to be sent by uplink PHY/MAC module 1840. Configuration information 1832 can include configuration information that affect operation of uplink LLC (ARQ) module 1840, e.g., an ARQ window size, maximum number of retransmissions, a discard timer, etc.

An uplink queue management module 1842 maintains information and controls processing relating to storage of data information to be sent by way of wireless communication interface module 1804, e.g., from end node 1800 to an access node. Uplink queue management module 1842 can, for example, control storage of data information awaiting transmission and maintain state information regarding data information awaiting transmission on a per traffic flow basis, e.g., packets associated with each flow may be stored in separate queues. For instance, uplink queue management module 1842 supports a variety of queue management techniques and/or capabilities, e.g., head drop, tail drop, as well as various Active Queue Management (AQM) mechanisms such as Random Early Detection (RED). Configuration information 1832 can include configuration information that affects operation of uplink queue management module 1842, such as queue limit, drop strategy, and/or AQM thresholds associated with one or more traffic flows.

An uplink classifier module 1844 controls processing relating to identification of data information as belonging to particular traffic flows prior to being sent by way of the wireless communication interface module 1804, e.g., from end node 1800 to an access node. In some embodiments, messages, packets, and/or frames to be sent through utilization of wireless communication interface module 1804 are classified as belonging to one of a variety of traffic flows by uplink classifier module 1844 based on inspection of one or more header and/or payloads fields. Results of classification by uplink queue management module 1842 as well as other modules within memory 1808. For example, the results may determine a particular queue the message, packet, and/or frame will be associated with for storage and further affect subsequent processing such as scheduling. Configuration information can include configuration information that affect operation of uplink classifier module 1844, e.g., a set of one or more classifier filter rules that prescribe criteria used to associate data information, e.g., messages, packets, and/or frames, as belonging to one or more traffic flows.

A downlink PHY/MAC module 1846 controls PHY layer and MAC layer processing relating to receiving data information by way of wireless communication interface module 1804. Operation of downlink PHY/MAC module 1846 can include both sending and receiving control information to coordinate receiving of data information. Configuration information 1804 can include configuration information that affect operation of downlink PHY/MAC module 1846, e.g., a frequency, band, channel, spreading code or hoping code to be used for reception, an identifier associated with end node 1800, etc.

A downlink LLC (ARQ) module 1848 includes processing associated with ARQ capabilities, e.g., retransmission of lost packets or frames. For example, downlink and/or trailer that encapsulates higher layer messages, which provides additional functionality, e.g., multi-protocol multiplexing/demultiplexing through a type field or error detection by way of a checksum field. Downlink LLC (ARQ) module 1848 can also perform reassembly of frames received by the downlink PHY/MAC module 1846 into higher layer messages. Configuration information 1832 can, and in some embodiments does, include configuration information, e.g., parameters settings, that affect operation of downlink LLC (ARQ) module 1848, e.g., an ARQ window size, maximum number of retransmissions, a discard timer, etc.

Figure 19:
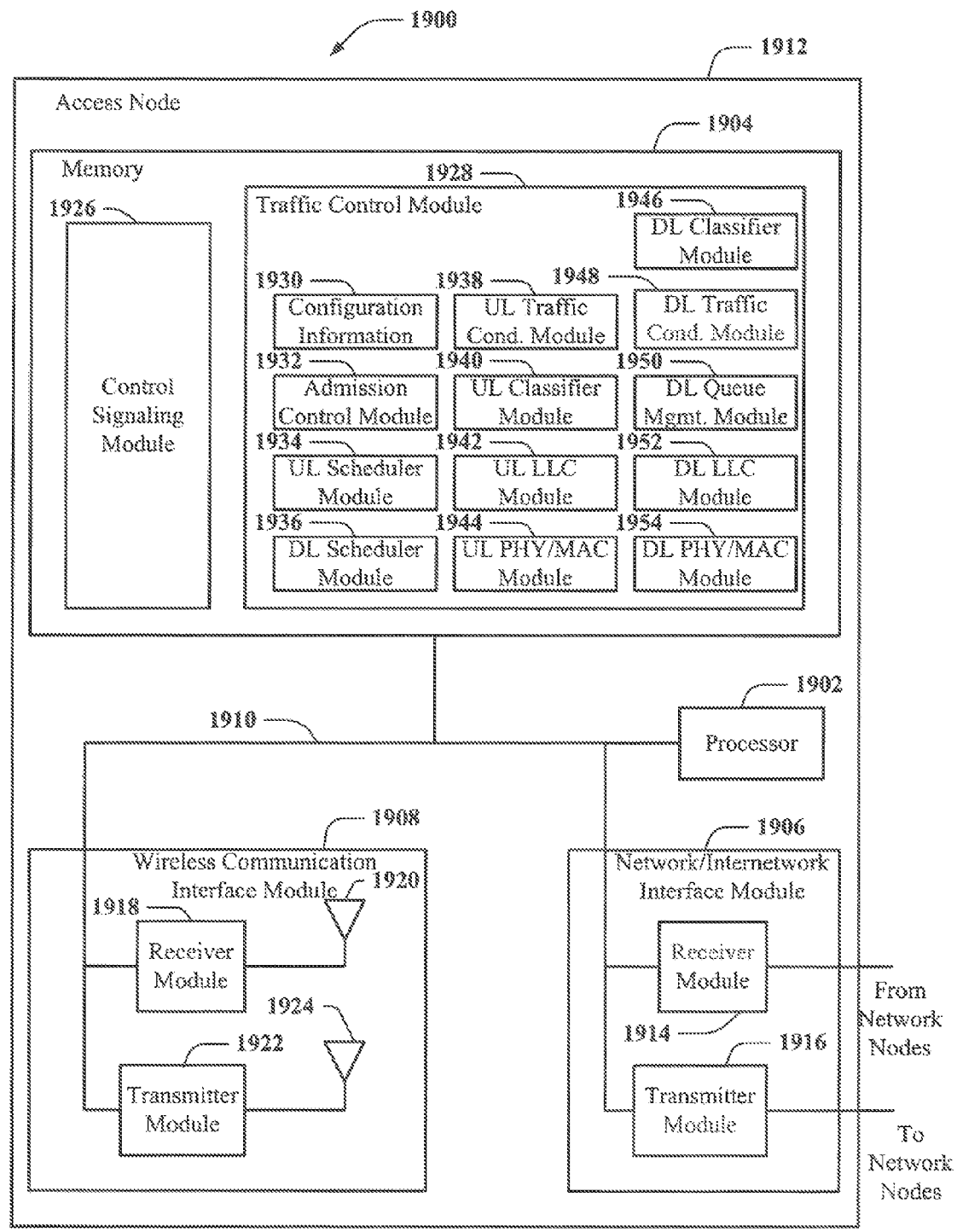
FIG. 19 illustrates an example access node.

FIG. 19 provides a detailed illustration of an example access node 1900 implemented in accordance with the present invention. The access node 1900 is a detailed representation of an apparatus that may be used as any one of the access nodes 1714-1718 depicted in FIG. 17. In the FIG. 19 embodiment, access mode 1900 includes a processor 1902, memory 1904, a network/internetwork interface module 1906 and a wireless communication interface module 1908, coupled together by bus 1910. Accordingly, by way of bus 1910 the various components of access node 1900 can exchange information, signals and data. The components 1902-1910 of access node 1900 are located inside a housing 1912.

Network/internetwork interface module 1906 provides a mechanism by which the internal components of access node 1900 can send an receive signals to/from external devices and network nodes. Network/internetwork interface module 1906 includes a receiver module 1914 and a transmitter module 1916 used for coupling node 1900 to other network nodes, e.g., through copper wires or fiber optic lines. Wireless communication interface module 1908 also provides a mechanism by which the internal components of access node 1900 can send and receive signals to/from external devices and network nodes, e.g., end nodes. Wireless communication interface module 1908 includes, e.g., a receiver module 1918 with a corresponding receiving antenna 1924. Wireless communication interface module 1908 is used for coupling access node 1900 to other nodes, e.g., by way of wireless communication channels.

Processor 1902 under control of various modules, e.g., routines, included in memory 1904 controls operation of access node 1900 to perform various signaling and processing. The modules included in memory 1904 are executed on startup or as called by other modules. Modules may exchange data information, and signals when executed. Modules may also share data information when executed. In the FIG. 19 embodiment, memory 1904 of access node 1900 includes a control signaling module 1926 and a traffic control module 1928, which further includes configuration information 1930 and various additional modules 1932-1954.

Control signaling module 1926 controls processing relating to receiving and sending signals, e.g., messages, for controlling operation and/or configuration of various aspects of access node 1900 including, e.g., traffic control module 1928 as well as configuration information 1930 and the various additional modules included therein 1932-1954. For instance, control signaling module 1926 includes state information, e.g., parameters, status and/or other information, relating to operation of access node 1900 and/or one or more signaling protocols supported by control signaling module 1926. In particular, control signaling module 1926 may include configuration information, e.g., access node identification information and/or parameter settings, and operational information, e.g., information about current processing state, status of pending message transactions, etc.

Traffic control module 1928 controls processing relating to receiving and sending data information, e.g., messages, packets, and/or frames, by way of wireless communication interface module 1908. For instance, traffic control module can include configuration information 1930 as well as various additional modules 1932-1954 that control various aspects of quality of service for packets and/or traffic flows, e.g., associated sequences of packets. In some embodiments, traffic control module 1928 includes state information, e.g., parameters, status and/or other information, relating to operation of access node 1900, traffic control module 1928, and/or one or more of the various additional modules included therein 1932-1954. Configuration information 1930, e.g., parameter settings, determines, affects and/or prescribes operation of traffic control module 1928 and/or the various additional modules included therein 1932-1954. The various additional modules are included, in some embodiments, to perform particular functions and operations as needed to support specific aspects of traffic control. In various embodiments, modules may be omitted and/or combined as needed depending on the functional requirements of traffic control. A description of each additional module included in traffic control module 1928 follows.

Admission control module 1932 maintains information relating to resource utilization/availability and determines if sufficient resources are available to support quality of service requirements of particular traffic flows. Resource availability information maintained by admission control module 1932 includes, e.g., packet and/or frame queuing capacity, scheduling capacity, as well as processing and memory capacity needed to support one or more traffic flows. Control signaling module 1926 and/or other modules included in access node 1900 can query admission control module 1932 to determine if sufficient resources are available to support a new or modified traffic flow, where the admission control determination is a function of the quality of service requirements of the particular traffic flow and/or the available resources. Configuration information 1930 can include configuration information, e.g., parameters settings, that affect the operation of admission control module 1932, e.g., an admission control threshold value that indicates the percentage of resource that may be allocated prior to rejecting additional request.

Uplink scheduler module 1934 control processing relating to transmission scheduling, e.g., order and/or timing, and allocation of transmission resources, e.g., information coding rate, transmission time slots, and/or transmission power, for data information, e.g., messages, packets, and/or frames, to be sent from one or more end nodes to the access node by way of wireless interface module 1908. Uplink scheduler module 1934 can schedule transmissions and allocate transmission resources as a function of the quality of service requirements and/or constraints associated with one or more traffic flows and/or one or more end nodes. Configuration information 1930 can include configuration information that affect the operation of uplink scheduler module 1934, e.g., a priority, rate bound, latency bound, and/or sharing weight associated with one or more traffic flows and/or end nodes. In some embodiments, scheduling and/or resources allocation operations performed by uplink scheduler module 1934 are additionally a function of channel conditions and other factors, e.g., power budget.

Downlink scheduler module 1936 controls processing relating to transmission scheduling, e.g., order and/or timing, and allocation of transmission resources, e.g., information coding rate, transmission time slots, and/or transmission power, for data information, e.g., messages, packets, and/or frames, to be sent from access node 1900 to one more end nodes through wireless interface module 1908. Downlink scheduler module 1936 can schedule transmissions and allocate transmission resources as a function of the quality of service requirements and/or constraints associated with one or more traffic flows and/or one or more end nodes. Configuration information 1930 can include configuration information that affects the operation of downlink scheduler module 1936, e.g., a priority, rate bound, latency bound, and/or sharing weight associated with one or more traffic flows and/or end nodes. In some embodiments, scheduling and/or resource allocation operations performed by the downlink scheduler module 1936 are additionally a function of channel conditions and other factors, e.g., power budget.

Uplink traffic conditioner module 1938 controls processing relating to traffic conditioning, e.g., metering, marking, policing, etc., for data information, e.g., messages, packets, and/or frames, received by way of wireless interface module 1908, e.g., from an end node to access node 1900. Uplink traffic conditioner module 1938 can condition traffic, e.g., meter, mark and/or police, as a function of the quality of service requirements and/or constraints associated with one or more traffic flows and/or one oe more end nodes. Configuration information 1930 can include configuration information that affects the operation of uplink traffic conditioner module 1938, e.g., a rate bound, and/or marking value associated with one or more traffic flows and/or end nodes.

Uplink classifier module 1940 controls processing relating to identification of data information, e.g., messages, packets, and/or frames, received through wireless interface module 1908, e.g., from an end node to access node 1900, as belonging to particular traffic flows prior to being processed by uplink traffic conditioner module 1938. In some embodiments, messages, packets, and/or frames received through wireless communication interface module 1908 are classified as belonging to one of a variety of traffic flows by uplink classifier module 1940 based on inspection of one or more header and/or payload fields. The results of classification by uplink classifier module 1940 can affect the treatment of the classified data information, e.g., messages, packets, and/or frames, by uplink traffic conditioner module 1938, e.g., the results may determine a particular data structure or state machine the message, packet, and/or frame will be associated with and further affect subsequent processing such as metering, marking, and/or policing. Configuration information 1930 can include configuration information that affects the operation of uplink classifier module 1940, e.g., a set of one or more classifier filter rules that prescribe criteria used to associate data information, e.g., messages, packets, and/or frames, as belonging to one or more traffic flows.

Uplink LLC (ARQ) module 1942 controls LLC layer processing relating to receiving data information, e.g., packets and/or frames, by way of wireless communication interface module 1908, e.g., from an end node to access node 1900. Uplink LLC (ARQ) module 1942 includes processing associated with ARQ capabilities, e.g., retransmission of lost packets or frames. In some embodiments, uplink LLC (ARQ) module 1942 further includes processing relating to an LLC header and/or trailer that encapsulates higher layer messages, e.g., packets, which provide additional functionality, e.g., multi-protocol multiplexing/demultiplexing through a type field or error detection by way of a checksum field. Uplink LLC (ARQ) module 1942 can also perform reassembly of frames received by uplink PHY/MAC module 1944 into higher layer messages, e.g., packets. The configuration information 1930 can include configuration information that affects the operation of uplink LLC (ARQ) module 1942, e.g., an ARQ window size, maximum number of retransmissions, a discard timer, etc.

Uplink PHY/MAC module 1944 controls PHY layer and MAC layer processing relating to receiving data information, e.g., packets and/or frames, by way of wireless communication interface module 1908, e.g., from an end node to access node 1900. In some embodiments, operation of uplink PHY/MAC module 1944 includes both sending and receiving control information, e.g., signals or messages, to coordinate receiving of data information, e.g., messages, packets, or frames. Configuration information 1930 can include configuration information that affects the operation of uplink PHY/MAC module 1944, e.g., a frequency, band, channel, spreading code or hopping code to be used for reception, an identifier associated with access node 1900, etc.

Downlink classifier module 1946 controls processing relating to identification of data information, e.g., messages, packets, and/or frames, as belonging to particular traffic flows prior to being sent through wireless communication interface module 1908, e.g., from access node 1900 to an end node. In some embodiments, messages, packets, and/or frames to sent by way of wireless communication interface module 1908 are classified as belonging to one of a variety of traffic flows by downlink classifier module 1946 based on inspection of one or more header and/or payload fields. The result of classification by downlink classifier module 1946 can affect the treatment of the classified by downlink classifier module 1946 can affect the treatment queue management module 1950 and other modules 1948, 1952, and 1954, e.g., the results may determine a particular queue the message, packet, and/or frame will be associated with for storage and further affect subsequent processing such as scheduling. Configuration information 1930 can include configuration information, e.g., parameters settings, that affect the operation of downlink classifier module 1946, e.g., a set of one or more classifier filter rules that prescribe criteria used to associate data information, e.g., messages, packets, and/or frames, as belonging to one or more traffic flows.

Downlink traffic conditioner module 1948 controls processing relating to traffic conditioning, e.g., metering, marking, policing, etc., for data information, e.g., messages, packets, and/or frames, to be sent by way of wireless interface module 1908, e.g., from access node 1900 to an end node. Downlink traffic conditioner module 1948 can condition traffic, e.g., meter, mark and/or police, as a function of the quality of service requirements and/or constraints associated with one or more traffic flows and/or one or more end nodes. Configuration information 1930 can include configuration information that affects the operation of downlink traffic conditioner module 1948, e.g., a rate bound, and/or marking value associated with one or more traffic flows and/or end nodes.

Downlink queue management module 1950 maintains information and controls processing relating to storage of data information, e.g., messages, packets, and/or frames, to be sent by way of wireless communication interface module 1908, e.g., from access node 1900 to an end node. Downlink queue management module can control storage of data information awaiting transmission and maintain state information regarding data information awaiting transmission on a per traffic flow basis, e.g., packets associated with each traffic flow may be stored in separate queues. In some embodiments of, Downlink queue management module 1950 supports a variety of queue management techniques and/or capabilities, e.g., head drop, tail drop, as well as various AQM mechanisms such as RED. Configuration information 1930 can include configuration information that affects the operation of downlink queue management module 1950, e.g., a queue limit, drop strategy, and/or AQM thresholds associated with one or more traffic flows.

Downlink LLC (ARQ) module 1952 controls LLC layer processing relating to sending data information, e.g., messages, packets, and/or frames, by way of wireless communication interface module 1908, e.g., from access node 1900 to an end node. Downlink LLC (ARQ) module 1952 includes processing associated with ARQ capabilities, e.g., retransmission of lost packets or frames. In some embodiments, downlink LLC (ARQ) module 1952 further includes processing relating to the addition of an LLC header and/or trailer to higher layer messages, e.g., packets, to provide additional functionality, e.g., multi-protocol multiplexing/demultiplexing through a type field or error detection by way of a checksum field. Downlink LLC (ARQ) module 1952 can also perform fragmentation of higher layer messages, e.g., packets, into multiple sub-portions, e.g., frames to be sent by downlink PHY/MAC module 1954. Configuration information 1930 can include configuration information that affects the operation of downlink LLC (ARQ) module 1952, e.g., an ARQ window size, maximum number of retransmissions, a discard timer, etc.

Downlink PHY/MAC module 1954 controls PHY layer and MAC layer processing relating to sending data information, e.g., messages, packets, and/or frame, by way of wireless communication interface module 1908, e.g., from access node 1900 to an end node. In some embodiments, operation of downlink PHY/MAC module 1954 includes both sending and receiving control information, e.g., signals or messages, to coordinate sending of data information, e.g., messages, packets, or frames. Configuration information 1930 can include configuration information that affects the operation of downlink PHY/MAC module 1954, e.g., a frequency, band, channel, spreading code or hoping code to be used for transmissions, an identifier associated with the access node 1900, etc.

Figure 20:
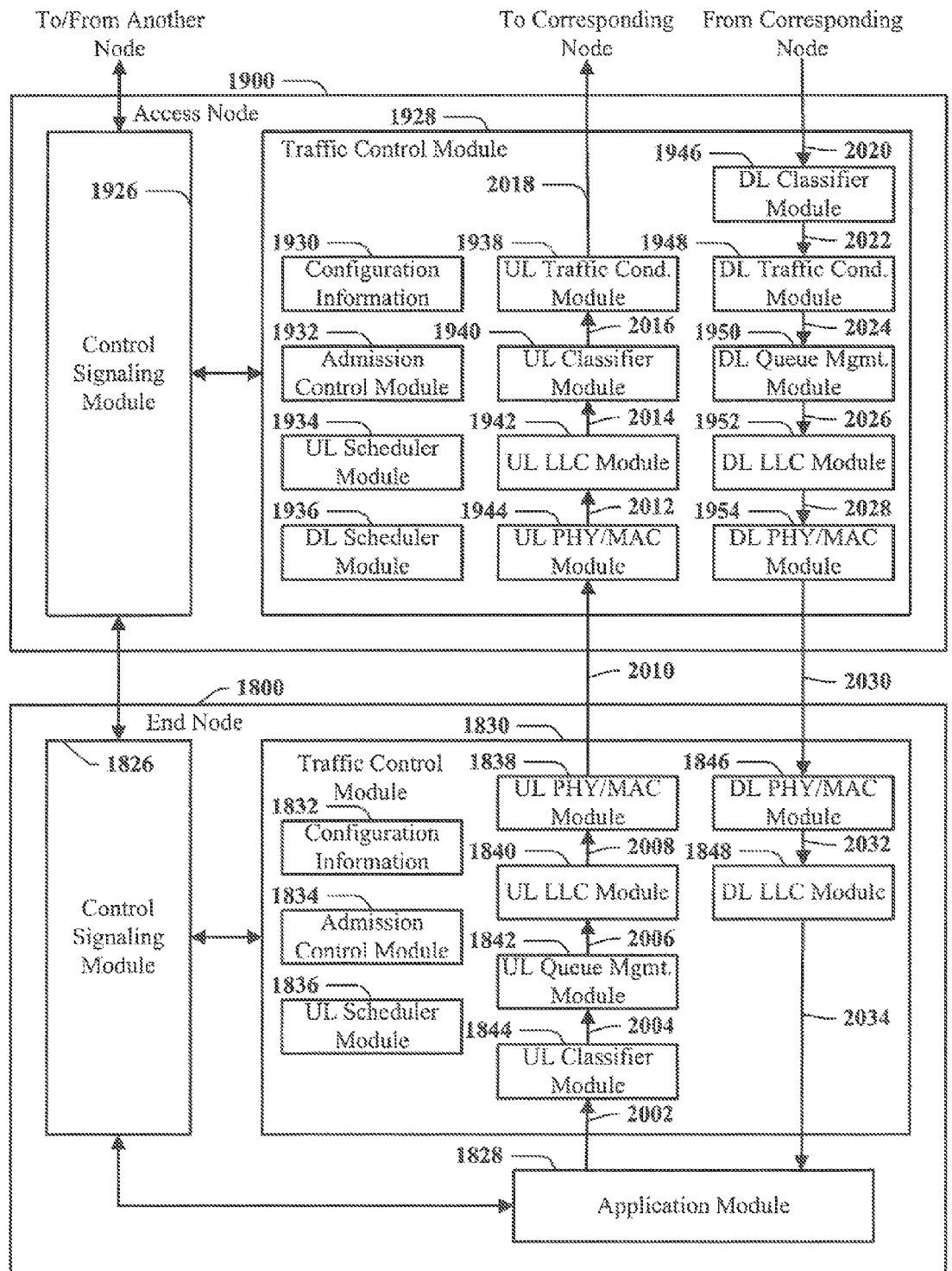
FIG. 20 illustrates an example end node communicating with an example access node.

FIG. 20 illustrates example signaling and traffic flows between various modules included in example end node 1800 and example access node 1900. The FIG. 20 end node 1800 and FIG. 20 access node 1900 are simplified representations of the FIG. 18 end node 1800 and FIG. 19 access node 1900, respectively. The FIG. 20 example shows application module 1828 sending and receiving data information, e.g., traffic flows comprising a sequence of messages, packets, or frames. In the context of the FIG. 17 example system, the FIG. 20 end node 1800 may be any one of end nodes 1702-1712 depicted in FIG. 17 and the application module 1828 included in the FIG. 20 end node 1800 may be exchanging data information with another node in the system, e.g., another end node 1702-1712 or the application server node 1726 as depicted in FIG. 17. In FIG. 20 and the subsequent description, the node with which the FIG. 20 end node 1800 is exchanging data information is referred to as the corresponding node.

The data information, e.g., traffic flows comprising a sequence of messages, packets, or frames, sent from the application module 1828 in the end node 1800 to a corresponding node is shown by a sequence of arrows 2002-2008 to proceed through a sequence of modules 1838-1844 included in the end node 1800 to the access node 1900, e.g., by way of wireless communication interface module 1804. Following reception by access node 1900, e.g., by way of wireless communication interface module 1908, the data information, e.g., traffic flows comprising a sequence of messages, packets, or frames, sent from the application module 1828 in end node 1800 to the corresponding node is shown by a sequence of arrows 2010-2018 to proceed through a sequence of modules 1938-1944 included in access node 1900 for processing, prior to being forwarded from the access node 1900 toward the corresponding node, e.g., directed in accordance with routing information to an intermediate node connected to the access node by way of network/internetwork interface module 1906.

The data information, e.g., traffic flows comprising a sequence of messages, packets, or frames, sent from a corresponding node to application module 1828 in end node 1828 id shown by a sequence of arrows 202-2028 to be received by access node 1900, e.g., by way of network/internetwork interface module 1906, and then to proceed through a sequence of modules 1946-1954 included in access node 1900 for processing, after which the data information is sent from the access node 1900 to the end node 1800, e.g., via the wireless communication interface module 1908. Following reception by end node 1800, e.g., by way of wireless communication interface module 1804, the data information, e.g., traffic flows comprising a sequence of messages, packets, or frame, sent from the corresponding node to application module 1828 in end node 1800 is shown by a sequence of arrows 2030-2034 to proceed through a sequence of modules 1846 and 1848 included in end node 1800 for processing, prior to being delivered to the application module 1828 in end node 1800.

In addition to the exchange of data information, e.g., traffic flows, FIG. 20, also depicts the exchange of control information, e.g., signaling flows and/or communication interfaces. In particular, the FIG. 20 example depicts the exchange of control information between control module 1926 and traffic control module 1928 included in access node 1900. Similarly, the FIG. 20 example depicts the exchange of control information between control signaling module 1826 and the traffic control module 1830 included in the end node 1800. In both access node 1900 and end node 1800, exchange of control information between the modules as shown allows the respective control signaling module 1926/1826 in the access/end node 1900/1800 to affect, e.g., set, modify, and/or monitor, the configuration and/or operation of the various modules included in the respective traffic control module 1928/1830, as needed to provide the proper quality of service treatment of the data information, e.g., traffic flows, to/from the application module 1828 in the end node 1800.

The exchange of control information, e.g., signaling flows and/or communication interfaces, is also shown a) between another node and control signaling module 1926 in access node 1900, b) between application module 1828 in end node 1800 and control signaling module 1826 in end node 1800, and c) between the respective control signaling modules 1926/1826 in access node 1900 and end bode 1800. These exchanges of control information, e.g., signaling flows and/or communication interfaces, enable the configuration and/or operation of traffic control modules 1928/1830 in both access node 1900 and the end node 1800 to be affected by a) one or more additional nodes, e.g. the access control node 1720 and/or application server node 1726, b) application module 1828 in the end node 1900, or c) a combination of one or more additional nodes and the application module 1828 in end node 1800. Various embodiments of the present invention may, and do, support all or only a subset of the depicted control information exchanges as needed.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description of the claims, such term is intended to be inclusive in a manner similar to the term "comprising" as "comprising" is interpreted when employed as a transitional word in a claim.

What is claimed is:

1. A method for supporting roaming between networks, comprising:
    receiving a request for network access at a visited network;
    receiving a profile corresponding to an access terminal from a home network, said profile including first service information corresponding to a first service, said first service information including Quality of Service (QoS) configuration information corresponding to said first service and a first policy decision point identifier identifying a first network element responsible for authorizing changes to said QoS configuration information corresponding to said first service;
    operating a component in the visited network to modify the QoS configuration information corresponding to the first service included in the received profile to produce a modified profile; and
    selectively offering services to said access terminal based at least in part on the modified profile.

2. The method of claim 1, wherein said received profile further includes second service information corresponding to a second service, said second service information including Quality of Service (QoS) configuration information corresponding to said second service and a second policy decision point identifier identifying a second network element responsible for authorizing changes to said QoS configuration information corresponding to the second service, said second network element being different from said first network element.

3. The method of claim 1, further comprising:
obtaining authorization from said first network element to modify the QoS configuration information corresponding to said first service.

4. The method of claim 1, further comprising receiving the profile as part of an access grant from the home network.

5. The method of claim 1, further comprising employing a virtual homing component as part of a home network.

6. The method of claim 5, the virtual homing component is associated with a Mobile Virtual Network Operator (MVNO).

7. The method of claim 6, the virtual homing component is employed with a roaming service.

8. The method of claim 1, further comprising performing authentication and authorization for devices on a visited network or on a home network.

9. The method of claim 1, the received profile provides service differentiation between subscribers or application services authorized by a given subscriber.

10. The method of claim 1, further comprising modifying the received profile according to an XML services description.

11. The method of claim 1, wherein the received profile includes QoS parameters that are associated with identification of packets as belonging to a traffic flow, parameters associated with traffic conditioning of a traffic flow, parameters associated with queuing/scheduling of a traffic flow, or parameters characterizing a traffic flow that enables an access node to determine a suitable QoS configuration to provide servicing of the traffic flow.

12. The method of claim 1, wherein modifying a service includes altering a Quality of Service parameter corresponding to said service in the received profile.

13. A communications apparatus, comprising:
a module for receiving a request for network access at a visited network and for receiving a profile corresponding to an access terminal from a home network, said profile including first service information corresponding to a first service, said first service information including Quality of Service (QoS) configuration information corresponding to said first service and a first policy decision point identifier identifying a first network element responsible for authorizing changes to said QoS configuration information corresponding to said first service;
a module in the visited network for modifying the QoS configuration information corresponding to the first service included in the received profile to produce a modified profile; and
a module for selectively offering services to said access terminal based at least in part on the modified profile.

14. The communications apparatus of claim 13, further comprising:
a policy control interface for obtaining authorization from said first network element to modify the QoS configuration information corresponding to said first service.

15. The communications apparatus of claim 13, wherein the received profile is associated with a Quality of Service (QoS) data set generated from the home network.

16. The communications apparatus of claim 15, wherein the QoS data set relate to one or more of latency associated with the multiple traffic flows, and maximum data rate associated with the multiple traffic flows, and maximum data rate associated with the multiple traffic flows.

17. The communications apparatus of claim 13, wherein said received profile further includes second service information corresponding to a second service, said second service information including Quality of Service (QoS) configuration information corresponding to said second service and a second policy decision point identifier identifying a second network element responsible for authorizing changes to said QoS configuration information corresponding to the second service, said second network element being different from said first network element.

18. A communications apparatus, comprising:
means for receiving a request for network access and for receiving a profile corresponding to an access terminal from a home network, said profile including first service information corresponding to a first service, said first service information including Quality of Service (QoS) configuration information corresponding to said first service and a first policy decision point identifier identifying a first network element responsible for authorizing changes to said QoS configuration information corresponding to said first service;
means for modifying, in the visited network, the QoS configuration information corresponding to the first service included in the received profile to produce a modified profile; and
means for selectively offering services to said access terminal based in part on the modified profile.

19. The communications apparatus of claim 18, further comprising:
means for obtaining authorization from said first network element to modify the QoS configuration information corresponding to said first service.

20. The communications apparatus of claim 18, wherein said received profile further includes second service information corresponding to a second service, said second service information including Quality of Service (QoS) configuration information corresponding to said second service and a second policy decision point identifier identifying a second network element responsible for authorizing changes to said QoS configuration information corresponding to the second service, said second network element being different from said first network element.

21. A non-transitory machine-readable medium having stored thereon machine-executable instructions, said non-transitory machine-readable medium comprising:
instructions for causing a processor to receive a request from an access terminal for network access at a visited network;
instructions for causing the processor to receive a profile corresponding to said access terminal from a home network, said profile including first service information corresponding to a first service, said first service information including Quality of Service (QoS) configuration information corresponding to said first service and a first policy decision point identifier identifying a first network element responsible for authorizing changes to said QoS configuration information corresponding to said first service;
instructions for causing the processor, when in the visited network, to modify the QoS configuration information corresponding to the first service included in the received profile to produce a modified profile; and
instructions for causing the processor to selectively offer services to said access terminal based at least in part on the modified profile.

22. The non-transitory machine-readable medium of claim 21, wherein said received profile further includes second service information corresponding to a second service, said second service information including Quality of Service (QoS) configuration information corresponding to said second service and a second policy decision point identifier identifying a second network element responsible for authorizing changes to said QoS configuration information corresponding to the second service, said second network element being different from said first network element.

23. The non-transitory machine-readable medium of claim 22, further comprising:
instructions for causing the processor to obtain authorization from said first network element to modify the QoS configuration information corresponding to said first service; and
instructions for causing the processor to selectively offer, to the access terminal in the visited network, at least one additional service which is not specified by the received profile.

24. A communications apparatus comprising:
a processor in a visited network configured to control said communications apparatus to:
receive a request for network access in the visited network;
receive a profile corresponding to an access terminal from a home network, said profile including first service information corresponding to a first service, said first service information including Quality of Service (QoS) configuration information corresponding to said first service and a first policy decision point identifier identifying a first network element responsible for authorizing changes to said QoS configuration information corresponding to said first service;
modify in the visited network, the QoS configuration information corresponding to the first service included in the received profile to produce a modified profile; and
selectively offer services to said access terminal based at least in part on the modified profile; and
a memory coupled to said processor.

25. The communications apparatus of claim 24, wherein said received profile further includes second service information corresponding to a second service, said second service information including Quality of Service (QoS) configuration information corresponding to said second service and a second policy decision point identifier identifying a second network element responsible for authorizing changes to said QoS configuration information corresponding to the second service, said second network element being different from said first network element.

* * * * *